(12) United States Patent
Lee et al.

(10) Patent No.: US 12,303,060 B2
(45) Date of Patent: May 20, 2025

(54) COFFEE EXTRACTION APPARATUS

(71) Applicant: LG Electronics Inc., Seoul (KR)

(72) Inventors: Wonkyu Lee, Seoul (KR); Jungwon Lee, Seoul (KR); Seoyoun Kim, Seoul (KR); Jongkwan Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 884 days.

(21) Appl. No.: 17/201,740

(22) Filed: Mar. 15, 2021

(65) Prior Publication Data

US 2021/0307557 A1    Oct. 7, 2021

(30) Foreign Application Priority Data

Apr. 1, 2020  (KR) .................. 10-2020-0039881

(51) Int. Cl.
 *A47J 31/42* (2006.01)
 *A47J 42/40* (2006.01)
 *A47J 42/50* (2006.01)
 *A47J 42/22* (2006.01)

(52) U.S. Cl.
 CPC ............ *A47J 31/42* (2013.01); *A47J 42/40* (2013.01); *A47J 42/50* (2013.01); *A47J 42/22* (2013.01)

(58) Field of Classification Search
 CPC ............ A47J 31/42; A47J 42/50; A47J 42/22
 USPC ........................................................ 99/286
 See application file for complete search history.

(56) References Cited

U.S. PATENT DOCUMENTS

| | | | | |
|---|---|---|---|---|
| 5,201,474 | A * | 4/1993 | Midden | A47J 42/20 241/246 |
| 10,004,354 | B2 * | 6/2018 | Leung | A23F 5/26 |
| 10,105,009 | B2 * | 10/2018 | Teahan | A47J 42/38 |
| 10,765,259 | B2 * | 9/2020 | Sahli | A47J 42/38 |
| 12,161,253 | B2 * | 12/2024 | Lee | A47J 31/0573 |

(Continued)

FOREIGN PATENT DOCUMENTS

| | | | |
|---|---|---|---|
| DE | 2020012799 | * | 12/2013 |
| EP | 2050377 | * | 4/2009 |

(Continued)

OTHER PUBLICATIONS

PCT International Search Report and Written Opinion in International Appln. No. PCT/KR2021/001547, dated May 28, 2021, 9 pages (with English translation).

*Primary Examiner* — Steven W Crabb
*Assistant Examiner* — Frederick F Calvetti
(74) *Attorney, Agent, or Firm* — Fish & Richardson P.C.

(57) ABSTRACT

A coffee extraction apparatus includes: a first grinder that includes a first burr configured to rotate, a first burr through-hole defined in the first burr in an axial direction of the first burr, a first burr inlet, a first burr outlet discharging coffee powder, a second burr inserted into the first burr through-hole through the first burr outlet to define a grinding space for grinding the whole beans with the first burr, and a burr coupler that supports the second burr and that couples the second burr to the first grinder. The apparatus further includes an extractor that defines an opening on a first side facing the first burr outlet to receive the coffee powder discharged through the first burr outlet and that mixes the coffee powder with water to extract coffee liquid where the burr coupler is configured to selectively separate the first grinder from the second burr.

19 Claims, 8 Drawing Sheets

(56) References Cited

U.S. PATENT DOCUMENTS

| | | | | |
|---|---|---|---|---|
| 2008/0185465 A1* | 8/2008 | Pai | ............................ | A47J 42/08 |
| | | | | 241/100 |
| 2013/0056567 A1* | 3/2013 | Lee | ........................ | A47J 42/02 |
| | | | | 241/24.26 |
| 2015/0102149 A1* | 4/2015 | Hsiao | ....................... | A47J 42/46 |
| | | | | 241/258 |
| 2016/0220067 A1 | 8/2016 | Teahan | | |
| 2017/0188747 A1* | 7/2017 | Leung | ..................... | A47J 31/42 |
| 2019/0380535 A1* | 12/2019 | Ullmann | ............... | F16C 35/067 |

FOREIGN PATENT DOCUMENTS

| | | | |
|---|---|---|---|
| EP | 3184010 | * | 6/2017 |
| JP | H05184467 | * | 4/2013 |
| KR | 2012128179 | * | 11/2012 |
| KR | 1020120128179 | | 11/2012 |
| WO | WO2014125006 | * | 8/2014 |
| WO | WO2015028372 | * | 3/2015 |
| WO | WO2016042324 | * | 3/2016 |
| WO | WO2019142758 | * | 1/2021 |

* cited by examiner

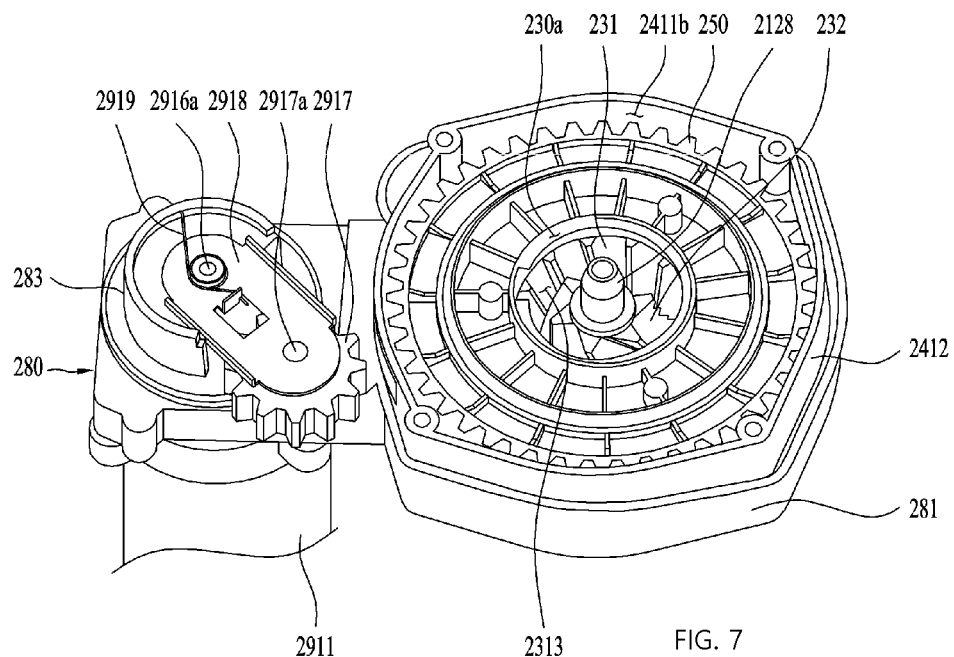
FIG. 7
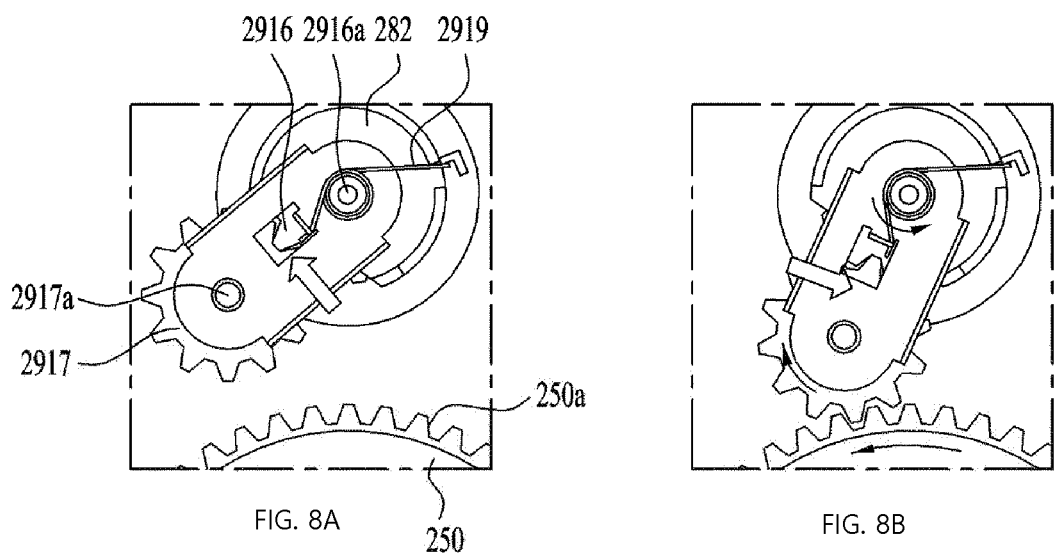
FIG. 8A
FIG. 8B
→ Rotation direction of first main gear, first subordinate gear, and first rotary part
⇨ Force applied to the first gear part

COFFEE EXTRACTION APPARATUS

CROSS-REFERENCE TO RELATED APPLICATION

This application claims the benefit of the earlier filing date and the right of priority to Korean Patent Application No. 10-2020-0039881, filed on Apr. 1, 2020, which is hereby incorporated by reference as if fully set forth herein.

TECHNICAL FIELD

The present disclosure relates to a coffee extraction apparatus, and relates to a grinder included in the coffee extraction apparatus.

BACKGROUND

With recent increase in a number of consumers who make drip coffee at home, demand for automatic coffee machines that automatically extract espresso or drip coffee is increasing. In addition, as the period in which freshness of ground beans is maintained is 1 to 2 weeks, which is not long, and the needs for high-quality whole beans increase, there is a growing demand for grinders along with increase in a number of consumers who desire to purchase fresh whole beans and grind the beans. To meet such needs and demands, automatic coffee machines with built-in grinders are being introduced into the market.

Burrs employed for grinders may be largely divided into three types: flat burr, conical burr, and roll-type burr. For example, flat burrs are used in places where a large amount of grinding is needed, such as coffee shops and cafes, whereas conical burrs are mostly used in households where a small amount of grinding is needed at a time. Roll-type burrs are widely used in factories that apply mass production techniques for coffee powder.

A conventional coffee machine including a grinder makes it easy to clean the grinder by allowing the grinder to be separated from the main body when the flat bur is vertically positioned and allowing the grinding blade to be separated. However, since the grinder employs a flat bur, in which ground beans are spread in the circumferential direction, a lot of beans are accumulated in the grinder. Further, the grinder lacks a means to absorb vibration by being directly connected to the drive gear that rotates the grinding blade. Accordingly, the grinder requires manual adjustment of the degree of grinding.

Another conventional coffee machine including a grinder employs a conical bur where inside of the conical burr is configured to rotate. Accordingly, a driving unit is required to be connected to the inside of the conical bur, and coffee grounds are discharged and accumulated in the driving unit. In addition, the degree of grinding must be manually adjusted.

SUMMARY

The present disclosure is directed to a coffee extraction apparatus.

The coffee extraction apparatus can maintain freshness of coffee by immediately grinding and using whole beans.

The coffee extraction apparatus can include a grinder that can be easily removed and cleaned.

The coffee extraction apparatus can simplify a movement path of coffee powder grounded by a grinder and minimize internal contamination.

The coffee extraction apparatus can impact and vibration generated in grinding whole beans by a grinder.

The coffee extraction apparatus can automatically adjust the degree of grinding of whole beans according to a user's preference.

The coffee extraction apparatus can minimize the path from the supply of whole beans to the discharge of the ground beans to minimize accumulation of the ground beans in an internal grinder. To this end, the ground beans are allowed to fall only in the vertical direction. In addition, an outer burr of a conical burr for grinding is rotated such that the path of the vertically falling ground coffee is not obstructed. In addition, the grinder is configured to be detached and disassembled for easy cleaning of the coffee grounds accumulated inside the grinder.

In addition, the coffee extraction apparatus can be configured to use a swing type idle gear to reduce the grinding impact when the grinder grinds whole beans, and allows the degree of grinding to be automatically adjusted for appropriate grinding of the supplied whole beans.

According to one aspect of the subject matter described in this application, a coffee extraction apparatus includes a first grinder. The first grinder can include a first burr configured to rotate, a first burr through-hole defined in the first burr in an axial direction of the first burr, a first burr inlet disposed at a first end of the first burr through-hole to allow whole beans to be introduced thereinto, a first burr outlet disposed at a second end of the first burr through-hole opposite to the first end of the first burr through-hole to discharge coffee powder, a second burr inserted into the first burr through-hole through the first burr outlet to define a grinding space for grinding the whole beans with the first burr, and a burr coupler that supports the second burr and that is configured to couple the second burr to the first grinder. The coffee extraction apparatus can further include an extractor that defines an opening on a first side facing the first burr outlet to receive the coffee powder discharged through the first burr outlet and that is configured to mix the coffee powder with water to extract coffee liquid, and a water supplier configured to supply water to the extractor. The burr coupler can be configured to selectively separate the first grinder from the second burr.

Implementations according to this aspect can include one or more of the following features. For example, the first grinder can further include a first rotary part coupled to an outer surface of the first burr to rotate the first burr.

In some examples, the first grinder can further include a first housing that accommodates the first rotary part and that supports the first rotary part, where the first housing can further include a housing body defining a space to accommodate the first rotary part, a first opening that is defined in the housing body and that is opened toward the extractor, and a second opening that is defined in the housing body opposite to the first opening. Based on the whole beans passing through the first burr inlet to the first burr outlet, the whole beans can be grounded into the coffee powder and the coffee powder can be discharged through the first opening.

In some implementations, the coffee extraction apparatus can further include a fixing shaft that is inserted through the second burr and that is coupled to the second burr in the axial direction of the first burr. In some examples, the coffee extraction apparatus can further include a second housing that defines a whole bean introduction hole allowing the whole beans to be introduced therethrough and that is coupled to the first housing in the axial direction of the first burr to allow the first rotary part to rotate.

In some examples, the second housing can include a fixing shaft support supporting the fixing shaft inserted into the whole bean introduction hole wherein the fixing shaft support can be connected to an inner surface of the whole bean introduction hole by at least one reinforcing rib. In some implementations, the coffee extraction apparatus can further include a driving unit disposed outside the first grinder and connected to the first rotary part to rotate the first rotary part where the driving unit can include a first power part configured to generate rotational power, and a first gear part connected to the first power part to rotate the first rotary part.

In some examples, the first grinder can further include a first housing that accommodates the first rotary part and that supports the first rotary part where the first housing can include a housing body defining a space to accommodate the first rotary part, a first opening that is defined in the housing body and that is opened toward the extractor, a second opening that is defined in the housing body opposite to the first opening, and a first communication hole defined through the housing body in a radial direction of the first rotary part. The first rotary part can have a gear shape on an outer circumferential surface of the first rotary part, and the first rotary part and the first gear part can be connected to each other through the first communication hole to rotate.

In some examples, the first grinder can further include a second housing that is rotatably coupled to the first rotary part in the axial direction of the first burr, that is coupled to the first housing, and that defines a whole bean introduction hole allowing the whole beans to be introduced from a side of the first burr inlet. The whole beans introduced through the whole bean introduction hole can be grounded into the coffee powder while moving from the first burr inlet to the first burr outlet, and the coffee powder can be discharged to the extractor through the first opening. In some examples, the first grinder can further include a second rotary part that is accommodated in the housing body so as to be positioned closer to the first opening than the first rotary part and that is connected to the burr coupler to move the second burr inserted into the first burr in the axial direction of the first burr to adjust a size of the grinding space.

In some implementations, the first rotary part and the second rotary part can be driven independently. In some examples, the coffee extraction apparatus can further include a second driving unit configured to rotate the second rotary part wherein the second driving unit can include a second gear part connected to the second rotary part to rotate the second rotary part, and a second power part configured to transmit rotational power to the second gear part.

In some examples, the housing body can further include a second communication hole defined through the housing body in a radial direction of the second rotary part. The second rotary part and the second gear part can be connected to each other through the second communication hole. In some examples, a center position of the first communication hole can be different from a center position of the second communication hole.

In some examples, the radial direction of the first rotary part having the first communication hole can be different from the radial direction of the second rotary part having the second communication hole.

In some implementations, the coffee extraction apparatus can further include a first power part configured to generate rotational power, a planetary gear part configured to reduce a rotational speed of the first power part at a predetermined ratio, and a first gear part connected to the planetary gear part to rotate the first rotary part. In some examples, the coffee extraction apparatus of claim 16 can further include a grinder fixing part defining a space that allows the first grinder to be detachably coupled to the grinder fixing part, a gear cover coupled to a side surface of the grinder fixing part to protect the planetary gear part, and a gear fixing part coupled to an upper portion of the gear cover to support the first gear part. The grinder fixing part, the gear cover, and the gear fixing part can be integrated with each other.

In some implementations, the burr coupler can include a burr coupler through-hole defined through the burr coupler in the axial direction of the first burr. A diameter of the burr coupler through-hole can be longer than a diameter of the second burr, and a portion of the second burr positioned on a side facing away from the first burr can be accommodated in the burr coupler through-hole such that the coffee powder discharged through the first burr outlet is discharged through the burr coupler through-hole.

In some examples, the coffee extraction apparatus can further include a ring-shaped handle coupled to the burr coupler to insert or separate the second burr. In some implementations, the coffee extraction apparatus can further include a supporter that is disposed outside the first grinder and the extractor and that supports the first grinder and the extractor.

BRIEF DESCRIPTION OF THE DRAWINGS

FIG. 7 shows an example of a first gear part and a first rotary part.

FIG. 8A is a diagram illustrating an example of disengagement of the first gear part from the first rotary part when the first gear part is stopped.

FIG. 8B is a diagram illustrating an example of engagement of the first gear part with the first rotary part when the first gear part is driven.

DETAILED DESCRIPTION

Table 1 below summarizes types of burrs mainly used in conventional grinders configured to grind whole beans. The burr is a core part of a grinder that grinds whole beans and has two parts (an outer burr and a center burr) provided with blades for grinding of whole beans arranged to face each other to grind beans. One part is fixed and the other part rotates to grind the beans. The supplied whole beans are ground using the blades of the outer burr located outside and the center burr located inside while a certain distance is maintained between the outer burr and the inner bur. Flat burrs or conical burs are mainly used in cafes and homes except for factories where whole beans are ground on a large scale. Both the flat burr and the conical burr grind beans grind beans using two blades engaging with each other, but they are distinguished form each other by the shapes thereof. The flat burrs may be divided into a vertical burr and a horizontal burr according to the direction in which the rotation axis of the bur is arranged.

In the case of the flat burr, the center burrs a1 and b1 are rotated by a driving unit located outside, and the outer burrs a2 and b2 are fixed. In the case of the vertical burr, the ground beans (or coffee powder) are not all discharged through a ground discharge portion, but are scattered and unintentionally piled up on both sides of the housing a3, b3. A large area may be contaminated by coffee powder, and the accumulated coffee powder may be unsanitary and has a risk of being mixed with newly ground beans and discharged, which may degrade the taste. In the case of the horizontal burr, the ground beans may be piled up, and it may be difficult to avoid contamination of a driving unit or a driving connection part configured to drive a vertical shaft because the driving unit or the driving connection part is arranged at a lower position. That is, in both the horizontal burr and the vertical burr, the entire interior of the housings a3 and b3 may be contaminated due to centrifugal force generated during grinding.

In contrary, the conical burr, which is widely employed for household use, may reduce contaminated areas through vertical fall in the direction of gravity. However, in the case of the conventional conical burr, the center burr c2 is arranged to rotate and the outer burr c1 is fixed. Accordingly, the driving unit for rotation of the center burr is disposed under the center burr. Accordingly, there is a very high possibility that the driving unit is contaminated by falling coffee powder.

TABLE 1

| Structure | Flat Burr | | Conical Burr |
|---|---|---|---|
| | Vertical | Horizontal | |
| Driving method | Direct shaft drive | Direct shaft drive | Direct shaft drive Rotating center burr, Fixed outer burr |
| Degree of contamination | Spread by centrifugal force → Entire interior contaminated | | Grinding section and horizontal conveying path contaminated |

Figure 1:
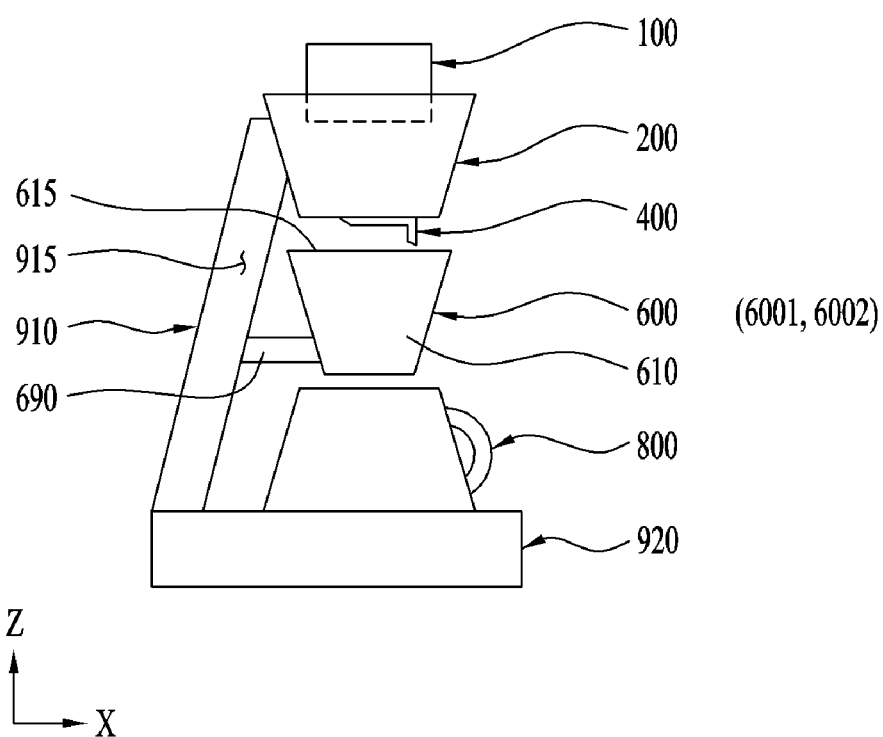
FIG. 1 is a diagram illustrating an exemplary coffee extraction apparatus.

As shown in FIG. 1, a coffee extraction apparatus 1000 can include a grinder 200 configured to ground whole beans into coffee powder having a size less than or equal to a preset size, a filter arranged under the grinder 200 to receive the coffee powder and extract coffee liquid by rotating the coffee powder with water, an extractor 600 including an accommodation part 610 allowing the filter to be inserted thereinto, the accommodation part 610 being configured to store the coffee liquid extracted through the filter or supplied water, a driving unit coupled to the filter to rotate the filter, a support 910 supporting the grinder 200 and the extractor 600 from the outside of the grinder 200 and the extractor 600, and a water supplier 400 configured to supply water to the extractor 600.

The whole beans grounded through the grinder 200 or the coffee powder can be accommodated in the extractor 600 through an extractor inlet 615 that opens toward the grinder 200. In some implementations, the coffee powder can be mixed with water supplied through the water supplier 400 to extract the coffee liquid.

The coffee extraction apparatus 1000 can further include a whole bean supplier 100 configured to supply whole beans to the grinder, and a base 920 arranged to support the support 910, the base 920 including a controller.

The whole bean supplier 100 can be manually opened by the user to supply whole beans, or can be configured in the form of a dispenser to store a lot of whole beans as to be dispensed several times, such that the whole beans are supplied to the grinder whenever necessary. Alternatively, the whole bean supplier 100 can be provided in the form of a disposable whole bean storage capsule containing a sufficient number of whole beams to make a drink of coffee. Once the whole bean storage capsule is coupled to the whole bean supplier 100, the whole bean storage capsule can be automatically opened to discharge the whole beans to the grinder 200.

In some implementations, an identification device containing the type of whole beans and the like can be attached to the bean storage capsule. The identification device can contain the type of whole beans, the degree of roasting, and the date of roasting. After the identification is recognized, the degree of grinding in the grinder 200, the extraction time in the extractor, and the like can be adjusted.

In some implementations, whole beans can fall from the bean supplier 100, and the falling beans can be grounded into coffee powder having a predetermined size or less by the grinder 200, and then accommodated in the filter provided in the extractor 600.

The grinder 200 can grind the supplied whole beans into coffee powder having a predetermined size or less. In the grinder 200, the grinding degree can vary depending on the kind of coffee and the degree of extraction can vary. Accordingly, the grinding degree can be set differently according to the user's selection or the kind of coffee. This is because the taste of coffee liquid may depend on the grinding degree, the degree of roasting, and the temperature of water.

The grinding degree of whole beans refers to a surface area that may contact water. Accordingly, finely grinding beans can have a larger surface area, and it can be easier to extract compounds in the finely ground whole beans.

In some implementations, the grinder 200 can reduce the impact when the whole beans are grounded and improve user's convenience for cleaning the grinder at home. To this end, the grinder can employ a conical burr (see FIG. 3A). Configuring an outer burr among a center burr and the outer burr of the conical burr to rotate can avoid positioning the driving unit in the drop zone of the coffee powder.

The extractor 600 can include a filter configured to receive coffee powder falling from the grinder 200 and an accommodation part 610 into which the filter is inserted. The filter can rotate the coffee powder and supplied water to extract coffee liquid.

The accommodation part 610 can store coffee liquid extracted through the filter or water which is at a first temperature. The filter can be made of a mesh material and thus can allow water or coffee liquid to freely pass therethrough while not allowing solid coffee powder to pass therethrough. Accordingly, when the filter rotates, coffee powder, water, and coffee liquid can be rotated inside the filter, and water and coffee liquid can rotate between the outside of the filter and the accommodation part 610.

A coffee server 800 capable of storing the extracted coffee liquid can be provided under the extractor 600. The coffee server 800 can be a pot having a kettle shape, or can have a typical cup shape. In addition, as the coffee cover is disposed under the extractor 600, it can store the discharged and dropping coffee liquid, or move the coffee liquid to another location through a discharge portion provided to guide the coffee liquid to the outside.

The extraction types can be divided into cold brew and hot brew by the temperature of water used for extraction in the extractor 600. When water at the first temperature, which is less than or equal to the room temperature, is used, the brewing type can be cold brew. When water at a second temperature, which higher than the first temperature, is used, the brewing type can be hot brew. The extractor 600 can include a first extractor 6001 which uses water at the first temperature and a second extractor 6002 which uses water at the second temperature, and the user can detachably attach one of the extractors to the support 910 according to a desired extraction method.

Since the first extractor 6001 uses water at the first temperature, it can be used to make cold brewed coffee. In some implementations, when water at the second temperature higher than the first temperature is used, the second extractor 6002 having a different structure from the first extractor can be used. The first extractor 6001 and the second extractor 6002 can have similar structures to be coupled to the support 910 and can occupy similar spaces between the grinder 200 and the coffee server 800 in the coffee extraction apparatus 1000. Accordingly, they can be replaceable with each other. Accordingly, the user may select the first extractor 6001 or the second extractor 6002 according to a desired extraction type. The water at the first temperature or the water at the second temperature can be supplied through the water supplier 400.

The water supplier 400 can supply water of the first temperature or water of the second temperature to the first extractor 6001 or the second extractor 6002 through the water supply nozzle 410. The water supplier 400 can receive water of the first temperature or water of the second temperature from an external water supply source. The water supplier 400 can receive water of the first temperature through the external water supply source, heat the water using a heater, and then supply the water to the second extractor 6002.

The extractor including the above-described filter relates to the first extractor 6001, and the second extractor 6002 can use a paper filter instead of the filter in the accommodation part 610 to drip and extract water of the second temperature.

Water may not be supplied from an external water supply source, but can be pre-stored in a water supply tank and then supplied through a water supply pipe connected to the water supply tank.

The extractor 600 can be fixed to the support 910 provided on the side by a support arm 690. The base 920 can be obliquely or vertically coupled to the support 910. The base can fix the support 910 and can support a load applied to the support 910. For example, the whole bean supplier 100, the grinder 200, the water supplier 400, and the extractor 600 can be directly or indirectly connected to the support 910, causing an eccentric load. Accordingly, a bending moment, shear force, and torsion can be applied to the support 910.

The base 920 can serve to fix and support the support 910 so as to withstand the bending moment, shear force, and torsion.

In some implementations, a controller configured to control the coffee extraction apparatus 1000 can be included in the base 920. The controller can control each motor that can be used for the grinder 200, the whole bean supplier 100, the first extractor 6001, or the water supplier 400, and control the amount of water from the water supplier, opening/closing of the discharge portion 680, rotation of the grinder, and the grinding degree of the grinder. The controller can be arranged in any other portion of the coffee extraction apparatus 1000.

The first extractor 6001 can be arranged under the grinder 200 to receive ground beans, that is, coffee powder, and mix the same with water to extract coffee liquid. For example, for cold brew type extraction of coffee liquid, the first extractor 6001 can use water of a first temperature lower than or equal to room temperature. The first extractor 6001 can include an accommodation part 610 and a filter.

The filter can be arranged inside the accommodation part. The filter can accommodate coffee powder that is grounded and dropped through the grinder 200. The coffee powder can be mixed with supplied water and stirred through rotation of the filter to extract coffee liquid. The filter can allow only water or the extracted coffee liquid to pass therethrough and may not allow coffee powder to pass therethrough. Accordingly, the coffee powder can be obstructed from moving to the accommodation part 610 by the filter. For example, most of the external appearance of the filter can be made of a mesh-type material to perform filtering.

The accommodation part 610 can provide a space for storing the extracted coffee liquid or water. Water of the first temperature (hereinafter, water having the first temperature is simply referred to as water unless otherwise specified) supplied through the water supplier 400 can be supplied to the accommodation part.

Figure 2A:
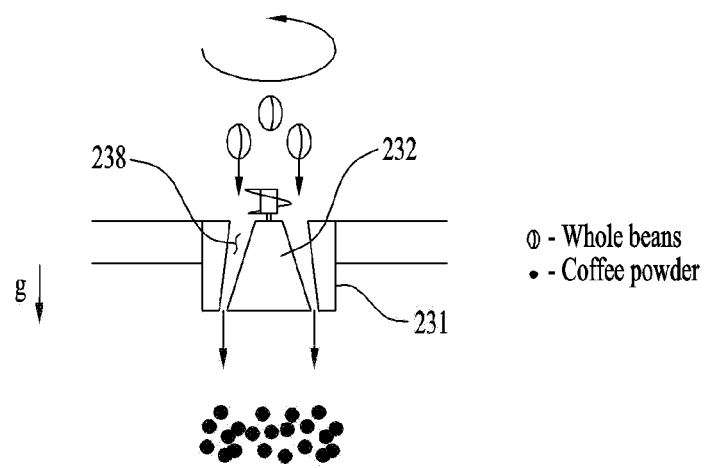
FIG. 2A is a diagram illustrating a grinding principle of a grinder included in the exemplary coffee extraction apparatus.

FIG. 2A is a diagram illustrating the grinding principle of the grinder 200 included in the coffee extraction apparatus 1000. The grinder can employ a conical burr, which has a simple structure and is suitable for home use. The conical burr can generate less heat and lower noise during grinding, and can maintain the flavor of coffee better than the flat burr.

Depending on the type of whole beans, the size of coffee powder for optimal coffee extraction can vary. For example, the finer the ground powder is, the larger the surface area in contact with water. However, since the surface area in contact with water may depend on the roasting degree of the whole beans, the grinding degree for the optimum coffee can vary among the whole beans.

Taste of coffee is determined by many factors including freshness of coffee, temperature and type of water, and extraction method. Among such factors, grinding is one of the most important factors in the coffee extraction process. Grinding is a process to increase the area for coffee extraction by grinding beans. This is because when coffee is extracted through the grinding operation, various coffee ingredients can dissolve in water more easily, affecting the coffee flavor. Accordingly, the operation of changing the particle size of individual coffee powder grains, that is, coffee particles through grinding may be referred to as adjustment of the grinding degree.

In order to adjust the degree of grinding according to the supplied whole beans, a second burr 232, which will be described later, can be moved in the axial direction of a first burr 231 to adjust the insertion depth thereof into the first burr through-hole 2313. The grinding degree can be adjusted automatically rather than manually. When the user inputs the type of whole beans, the controller can control the driving unit to adjust the grinding degree. Alternatively, the controller can read a barcode attached to a capsule supplied to the coffee bean supplier or a near field communication (NFC) based communication chip, and can automatically set an appropriate grinding degree.

The conical burr can include a first burr 231 positioned outside and a second burr 232 inserted into the first burr 231 to define, together with the first burr 231, a grinding space in which whole beans are grounded. In the case of a conventional conical burr, the first burr 231 is fixed, and the second burr 232 rotates to grind the whole beans into coffee powder. This is because rotating the second burr 232 positioned inside makes it easy to align the rotation centers of the first burr 231 and the second burr 232. However, this structure may cause the coffee powder to be accumulated on the driving unit because the driving unit, which is configured to drive the second burr 232 must be connected to the second burr 232. In this case, the accumulated coffee powder may cause contamination and malfunction of the driving unit.

On the other hand, in the case of the coffee extraction apparatus 1000, the first burr 231 positioned outside can rotate and the second burr 232 can be fixed. The coffee extraction apparatus 1000 can also include components for aligning the rotation centers of the first burr 231 and the second burr 232.

Figure 2B:
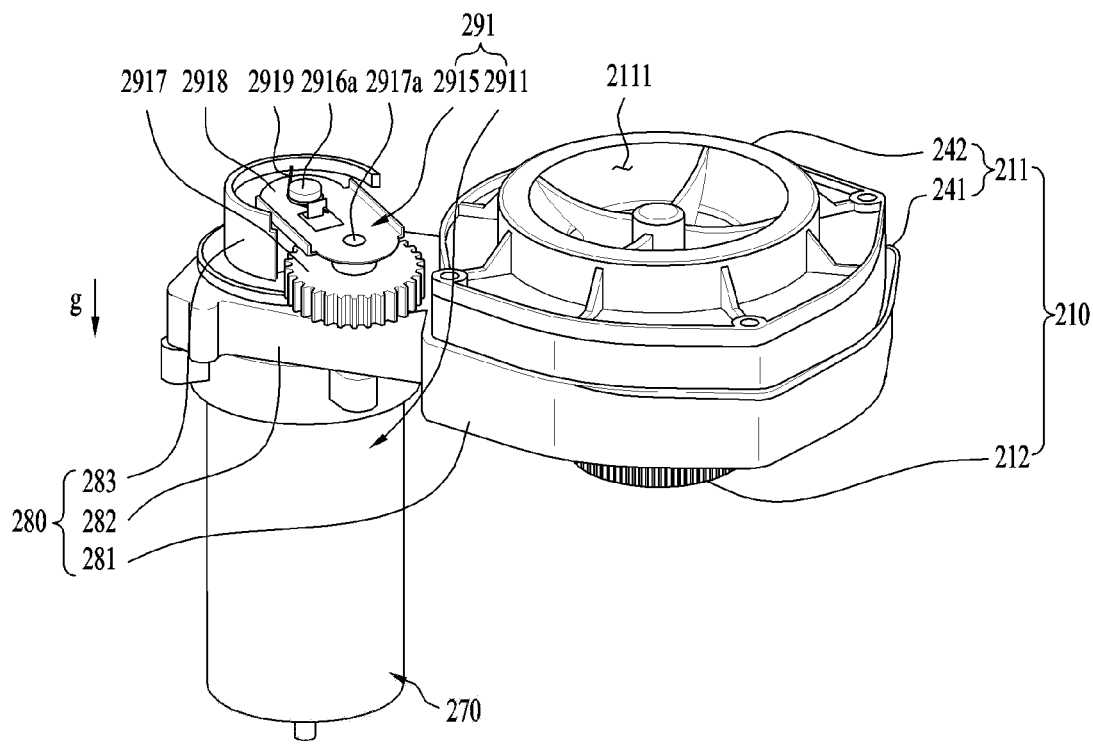
FIG. 2B is a diagram illustrating an exemplary grinder included in the coffee extraction apparatus.

FIG. 2B is a diagram illustrating an example of the grinder 200 in the coffee extraction apparatus 1000. The grinder 200 can include a grinder assembly 210 configured to grind supplied whole beans, and a driving unit 290 configured to support the grinder assembly 210 and drive the grinder assembly 210.

The grinder assembly 210 can include a first grinder 211 including the first burr 231, and a second grinder 212 including the second burr 232 inserted into the first burr 231, the second grinder 212 being coupled to the first grinder 211.

A first grinder inlet 2111 can be provided on the side from which whole beans are supplied to the first grinder 211, and thus the first grinder 211 can receive the whole beans and transfer the same to the first burr 231 positioned therein. The first burr 231 and the second burr 232 can grind the supplied whole beans using blades and discharge the ground beans.

The first grinder 211 can include a first housing 241 defining an outer shape of the first grinder 211 and a second housing 242 coupled to the first housing 241.

The second grinder 212 can include the second burr 232. The first grinder 211 and the second grinder 212 can be coupled to each other when the second burr 232 is inserted into the first burr 231.

A support assembly 270 can be provided to support the grinder assembly 210 and transmit power to the grinder assembly 210. The support assembly 270 can include a first driving unit 291 and a second driving unit 292 (refer to FIG. 5), which transmit rotational force to the grinder assembly 210. The first driving unit 291 can include a first gear part 2915 and a first power part 2911 configured to rotate the first gear part 2915. The second driving unit 292 can include a second gear part 2925 and a second power part 2921 configured to transmit rotational power to the second gear part 2925 (see FIG. 5).

In some implementations, a planetary gear part 2913 (see FIG. 4A) can be further provided between the first gear part 2915 and the first power part 2911. The planetary gear part 2913 can be used to reduce the number of rotations of a motor provided in the first power part 2911 and increase torque.

FIG. 2B is a diagram illustrating an example in which a swing-type idle gear is employed for the first gear part 2915. The idle gear may refer to a subordinate gear arranged to connect gears. In some implementations, the first gear part 2915 can include a first main gear 2916 and a first subordinate gear 2917. The first subordinate gear 2917 can be connected to a first rotary part 250 provided in the first grinder 211.

The first gear part 2915 can further include a gear connection arm 2918 configured to connect and support the first main gear 2916 (see FIG. 4A) and the first subordinate gear 2917, and an elastic member 2919 connected to the gear connection arm 2918 to provide elastic force. The elastic member can be fitted onto a first main gear shaft 2916a, which is a rotational shaft of the first main gear, and then fixed to a gear fixing part 283, which supports the first gear part 2915, to provide restoring force to the gear connection arm 2918.

Figure 4A:
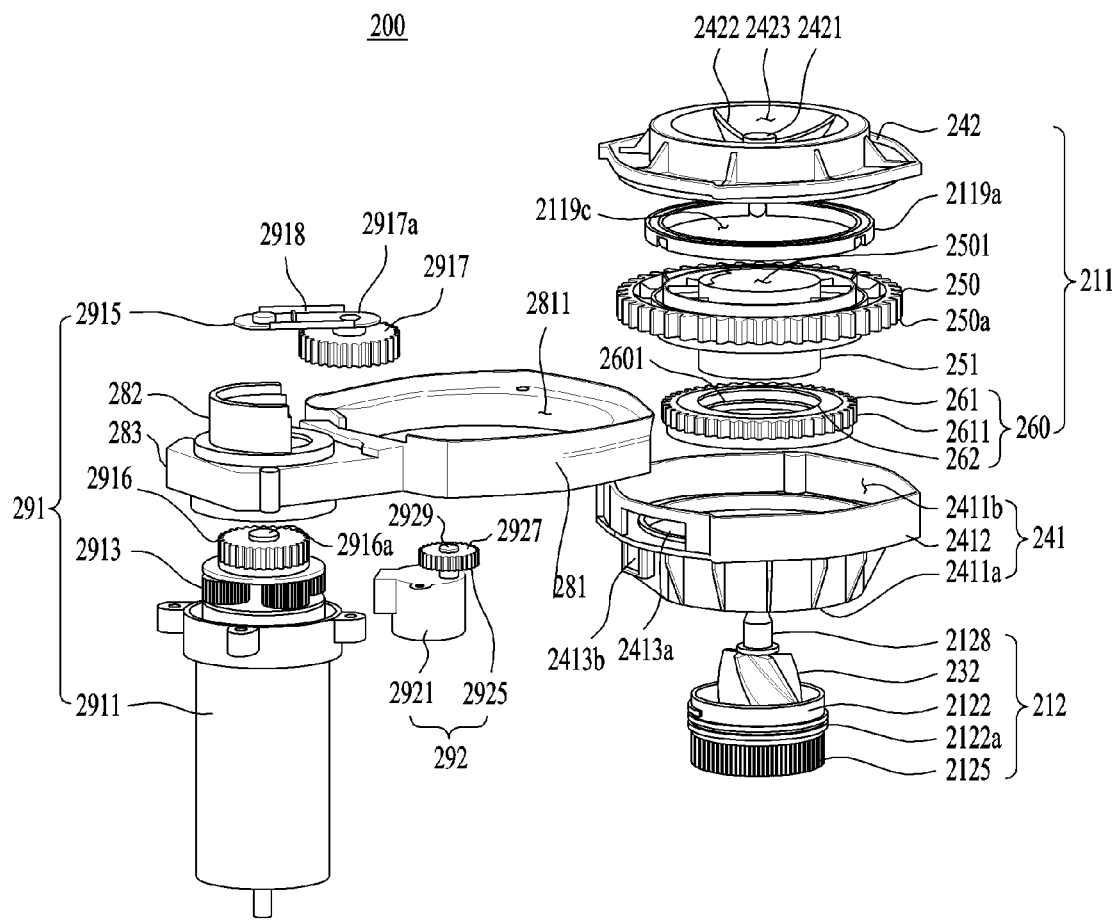
FIG. 4A is a diagram illustrating an exploded view of an exemplary grinder included in the coffee extraction apparatus.

In some implementations, as a feature of the swing-type idle gear, the first main gear 2916 can be connected to the first main gear shaft 2916a and thus connected to the first power part 2911 via the planetary gear part 2913 (see FIG. 4A). In addition, the first main gear shaft 2916a can be connected to the planetary gear part 2913, and can be allowed to rotate in position.

In some implementations, the first subordinate gear 2917, which is connected to the first main gear 2916, can rotate while revolving around an axis. A first subordinate gear shaft 2917a can be supported by the gear connection arm 2918 and serve to support rotation of the first subordinate gear 2917. The first subordinate gear shaft 2917a can move in the circumferential direction of the first main gear 2916 while supporting the rotation of the first subordinate gear. For example, the first subordinate gear 2917 can revolve around the first main gear 2916.

When the first main gear 2916 rotates in a first rotation direction, the first subordinate gear 2917 and the gear connection arm 2918 can be rotated in a second rotation direction and connected to the first rotary part 250 (see FIG. 4A) to rotate the first rotary part in the first rotation direction. When the first main gear 2916 does not rotate, the gear connection arm 2918 and the first subordinate gear 2917 can be rotated in the first rotation direction and separated from the first rotary part by the restoring force of the elastic member 2919.

For example, the restoring force of the elastic member can be designed to be less than the rotational power of the first main gear 2916 that rotates the rotational shaft of the first subordinate gear or the gear connection arm. Thus, only when the first main gear 2916 does not rotate, the restoring force can be transmitted to the first subordinate gear through the gear connection arm in the opposite direction to separate the first subordinate gear from the first rotary part.

Thereby, it can be ensured that the first subordinate gear 2917 is always connected to the first rotary part when rotating. For example, when repulsive force or vibration caused by an impact occurring during grinding of the whole beans on the first rotary part is momentarily transmitted in the opposite direction to the first subordinate gear 2917, the gear connection arm 2918 can freely rotate, and the rotational power of the main gear 2916 can keep the first subordinate gear 2917 connected to the first rotary part 250.

Thus, the impact transmitted from the first rotary part to the first main gear shaft 2916a or the first power part 2911 through the first main gear 2916 can be minimized, and accordingly the impact transmitted to the first gear part 2915, the planetary gear part 2913 and the first power part 2911 can be limited.

For example, the first subordinate gear shaft 2917*a* can revolve around the first main gear shaft 2916*a* while being spaced apart from the first main gear shaft 2916*a* by a certain distance by the gear connection arm 2918.

In some implementations, when the first main gear 2916 rotates in a first rotation direction, the first subordinate gear 2917, the first subordinate gear shaft 2917*a*, and the gear connection arm 2918 can rotate in a second rotation direction opposite to the first direction.

The first power part 2911 can include a first motor, which is a drive motor. In some implementations, the first power part 2911, the gear fixing part 283, a portion of the gear cover 282, and a portion of the first gear part 2915 can be disposed in an installation space 915 provided inside the support 910.

Accordingly, a portion of the gear cover 282, a portion of the first gear part 2915, a grinder fixing part 281, and the grinder assembly 210 can be arranged outside the support 910 and thus be exposed to the user.

The grinder assembly 210 can be coupled to a coupling space 2811 (see FIG. 4) of the support assembly. The grinder assembly 210 can further include a grinder fixing part 281 defining the coupling space to provide the coupling space for attachment/detachment of the first grinder 211, a gear cover 282 coupled to a lateral surface of the grinder fixing part 281 to protect the planetary gear part 2913 (see FIG. 4), and a gear fixing part 283 coupled to an upper portion of the gear cover 282 to support the first gear part 2915.

The grinder fixing part 281, the gear cover 282, and the gear fixing part 283 can be integrated with each other. For example, these elements can be formed as a single plastic item by injection molding. In addition, they can be formed of a metal material by a press process, or can be formed into a single grinder case 280 by a method such as welding or riveting.

In FIGS. 2A and 2B, the direction of gravity is indicated by g. Although the figures illustrate that the whole beans supplied through the first grinder inlet 2111 fall vertically by gravity, the first grinder inlet 2111 may not necessarily be arranged in the direction of gravity. However, when the coffee powder falls according to gravity, a separate device for dropping of the coffee powder may not be required. In addition, since the direction of gravity is almost perpendicular to the bottom surface on which the coffee extraction apparatus is placed, the movement path of coffee powder from the grinder 200 to the extractor 600 can be straightened. This straightening can simplify and shorten the movement path of the coffee powder, thereby minimizing accumulation of coffee powder inside the grinder 200.

In addition, when the first burr 231, which is an outer burr, rotates, the first rotary part 250 (see FIG. 4) that rotates the first burr 231 is not located in the movement area of coffee powder, and accordingly contamination of the first rotary part can be minimized.

Figure 3A:
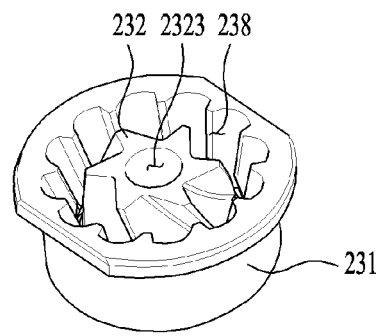
FIG. 3A is a diagram illustrating an example of assembled form of a conical burr included in the grinder.

FIG. 3A is a diagram illustrating the first burr 231 for grinding the whole beans, the second burr 232 inserted into the first burr 231, and a grinding space 238 formed when the first burr 231 and the second burr 232 coupled to each other. The burrs are a kind of conical burrs. Unlike the conventional conical burr, the first burr 231 located on the outside can rotate. In some implementations, after the second burr 232 is inserted into and coupled to the first burr, the second burr can be allowed to move only in the axial direction of the first burr to adjust the grinding degree, and does not rotate.

Adjusting the grinding degree may refer to adjusting the size of the grinding space in order to adjust the size of ground coffee powder to a preset value. Regarding the size of the grinding space, the second burr 232 can have a conical shape. Accordingly, when the second burr 232 is inserted into the first burr 231 and moved along the first burr through-hole 2313 (see FIG. 3B), the separation distance between the first burr 231 and the second burr 232 can vary, and accordingly the size of the grinding space can be adjusted.

In some implementations, the first burr 231 can include a sharp blade for grinding whole beans provided on the inner circumferential surface of the first burr through-hole 2313. Accordingly, the first burr 231 can refer to an outer serrated burr. In some implementations, the second burr 232 can have a conical shape and can refer to a cone-shaped center burr.

Figure 3B:
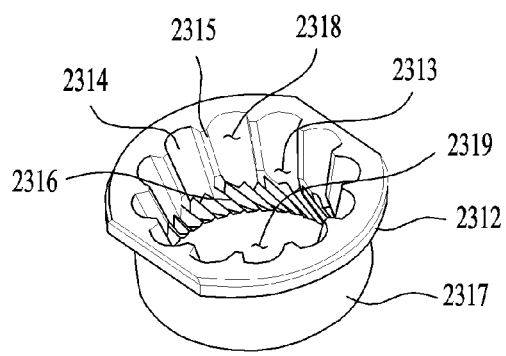
FIG. 3B is a diagram illustrating an example of a first burr, which is an external burr of the conical burr.

Referring to FIG. 3B, the first burr 231 can include a first burr through-hole 2313 penetrated in an axial direction for rotation of the first burr 231, and a first burr inlet 2318 positioned at one end of the first burr through-hole to allow whole beans to be introduced therethrough, and a first burr outlet 2319 positioned at an opposite end of the first burr through-hole to grind the whole beans and discharge coffee powder.

The whole beans introduced through the first grinder inlet 2111 can be supplied through the first burr inlet 2318, ground in the grinding space, and then discharged through the first burr outlet 2319. The shape or the cross-section of a portion of the outer surface of the first burr that is closer to the first burr inlet 2318 than the first burr outlet 2319 can have an angled shape, but the shape or the cross-section of a portion of the outer surface of the first burr that is closer to the first burr outlet 2319 than the first burr inlet 2318 can have a circular shape. The first burr 231 can be coupled to the first rotary part 250 (see FIG. 4A) at the side of the first burr inlet 2318 for rotation. The shape or the cross-section of a portion of the outer surface of the first burr that is closer to the first burr inlet 2318 than the first burr outlet 2319 can have an angled shape to limit a slip effect between the first rotary part 250 and the first burr when the first burr is coupled to the first rotary part 250 (see FIG. 4A). The angled shape or the angled cross-section can include a curved line and a straight line.

In some implementations, the outer surface of the first burr outlet 2319 can be rotatably inserted into a second rotary part 260 (see FIG. 4A), and thus can have a circular cross section. Accordingly, the outer surface of the first burr outlet can refer to a first burr outer circumferential surface 2317.

The inner circumferential surface of the first burr through-hole 2313 can include a first burr inclined portion 2314 and a first burr blade 2316. A portion of the first burr through-hole close to the first burr inlet 2318 can be provided with the first burr inclined portion 2314. The first burr inclined portion can include a plurality of guide protrusions 2315 for guiding the whole beans. The first burr inclined portion can be inclined as it extends toward the first burr outlet 2319. In some implementations, the plurality of guide protrusions 2315 can have a tapered shape such that the size of the first burr through-hole 2313 decreases as the first burr through-hole extends toward the first burr blade 2316. This configuration is intended to reduce the gap between the first burr 231 and the second burr 232 to allow whole beans to be ground as they pass through the grinding space one after another.

A first burr blade 2316 can be provided at the side of the first burr outlet 2319 to grind whole beans into coffee powder.

Figure 3C:
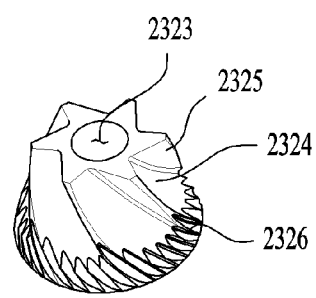
FIG. 3C is a diagram illustrating an example of a second burr, which is a center burr of the conical burr.

FIG. 3C is a diagram illustrating the second burr 232, which is inserted into the first burr through-hole 2313 through the first burr outlet to define a grinding space for grinding whole beans together with the first burr 231. The second burr 232 can include a second burr through-hole 2323 penetrated in the axial direction of the first burr, a second burr inclined portion 2324 defined on the outer circumferential surface of the second burr 232 to correspond to the first burr inclined portion 2314, a plurality of impellers 2325 corresponding to the plurality of guide protrusions 2315, and a second burr blade 2326 corresponding to the first burr blade 2316.

Of a plurality of beans supplied at the same time, only one bean can be introduced into a space defined between one guide protrusion 2315 and an adjacent protrusion 2315 and between one impeller 2325 and an adjacent impeller 2325 by the guide protrusions 2315 and the impellers 2325 and can be grounded into coffee powder by the first burr blade 2316 and the second burr blade 2326. The size of the grinding space of the first burr and the second burr can be adjusted by moving the second burr 232 along the axis of the first burr, thereby adjusting the grinding degree. Thereafter, the whole beans supplied and grounded will be discharged as coffee powder having a size less than or equal to an expected size according to the grinding degree because the separation distance between the first burr 231 and the second burr 232 can be fixed, that is, the size of the grinding space is fixed.

FIG. 4A is a diagram illustrating an exploded view of an example of the grinder 200. The grinder 200 can include a grinder assembly 210 and a support assembly 270 configured to support the grinder assembly 210 and transmit power. The grinder assembly 210 can include a first grinder 211 and a second grinder 212 coupled to the first grinder 211.

The first grinder 211 can include a first burr 231 configured to rotate, a first burr through-hole 2313 defined through the first burr 231 in an axial direction, a first burr inlet 2318 positioned at one end of the first burr through-hole 2313 to introduce the whole beans therethrough, and a first burr outlet 2319 positioned at an opposite end of the first burr through-hole 2313 to grind the whole beans and discharge the same as coffee powder.

The second grinder 212 can include a second burr 232 inserted into the first burr through-hole 2313 through the first burr outlet 2319 to define a grinding space for grinding of whole beans together with the first burr 231, and a burr coupler 2122 configured to support the second burr and couple the second burr to the first grinder 211.

The burr coupler 2122 can be coupled to the first burr 231 in the axial direction of the first burr to support the second burr 232 and couple the second burr 232 to the first grinder 211. The outer circumferential surface of the burr coupler 2122 can be provided with a burr coupler thread 2122a, and can be coupled to a second rotary part 260 through the burr coupler thread 2122a.

The second grinder 212 can further include a handle 2125 allowing a user to easily hold the burr coupler 2122. The outer circumferential surface of the handle 2125 can be processed to have bumps. Accordingly, when the handle is held by the user, it can limit the slipping effect, and allow the user to transmit appropriate rotational force to the second grinder 212. Accordingly, the second burr 232 and the burr coupler 2122 can be rotated by the handle 2125 so as to be screwed to the second rotary part 260.

The first grinder 211 can further include a first rotary part 250 coupled to an outer surface of the first burr to rotate the first bur. The first rotary part 250 can be coupled to a first burr outer surface 2312 located at the first burr inlet 2318. The first rotary part 250 can include a first rotary part through-hole 2501 defined therethrough in the axial direction of the first bur. The first rotary part through-hole 2501 and the first burr inlet 2318 can communicate with each other.

In order to rotate the first rotary part 250, gear teeth can be provided along a first rotary part outer circumferential surface 250a, which is the outer circumferential surface of the first rotary part 250. The first rotary part 250 can be connected to a first gear part 2915 through the gear teeth. A gear such as the first rotary part can refer to a ring gear. For example, the outer circumferential surface of the ring having a through-hole formed in the axial direction can have a gear shape.

In order to rotate the first burr 231, the first rotary part 250 can have a diameter as large as to have a large rotational moment of inertia, and can be formed of a material having a large weight if necessary. Thereby, vibrations caused by impacts during grinding of whole beans can be reduced, and accordingly a uniform size of coffee powder can be obtained.

Since the first burr 231 is rotated through the first rotary part 250 coupled to the outer surface of the first burr 231, the second burr 232 can be inserted into the first burr 231 without any driving device and can be only allowed to slightly move in the axial direction of the first burr 231 to adjust the size of the grinding space to adjusting the grinding degree. Thus, accumulation of coffee powder in the driving device of the second burr 232 may not occur when coffee powder is discharged. Accordingly, the effects of easy cleaning and contamination prevention can be obtained.

The first rotary part 250 can be coupled to the first burr 231 and accommodated in the first housing. For example, the first grinder 211 can include a first housing 241 configured to accommodate the first rotary part 250. The first housing 241 can include a housing body 2412 defining a space to accommodate the first rotary part 250, a first opening 2411a provided in the housing body 2412 and opened toward the extractor 600, a second opening 2411b provided in the housing body 2412 and arranged on a side opposite to the first opening 2411a.

Thus, the housing body 2412 can only have a lateral surface, and openings can be formed in both one surface face of the housing body close to the extractor 600 and the opposite surface of the housing body on the side opposite to the one surface. The first burr 231 and the first rotary part 250 can be introduced into the housing body 2412 through the second opening 2411b and be coupled to each other. In some implementations, the supplied whole beans can be discharged through the first opening 2411a via the first rotary part through-hole, the first burr inlet, and the first burr outlet.

A second housing 242 can be coupled to the second opening 2411b. The first rotary part 250 can be rotatably coupled to the second housing 242, and thus the second housing 242 can limit the rotation center of the first rotary part 250 from shaking. For example, the first burr 231 does not have a shaft at the center of rotation, and the first rotary part 250 coupled to the outer surface of the first burr 231 can rotate. Accordingly, it may be more difficult to maintain the center of rotation than when a rotational shaft is used.

The grinding space between the first burr 231 and the second burr 232 should be kept constant to produce coffee powder having a desired grinding degree. Therefore, maintaining a constant distance between the first burr 231 and the second burr 232 when the first burr 231 is rotated may be important. In this regard, the first housing 241 and the second housing 242 can be coupled to each other to fix the position of the first rotary part 250.

The first rotary part 250 can further include a first burr fixing part 251 to couple the first burr 231 and the first rotary part 250. The first burr fixing part 251 can be provided to the coupling portions of the first rotary part 250 and the first burr inlet 2318 to block the coffee powder from escaping through the gap, and allow the rotational power of the first rotary part to be transmitted to the first burr without slip.

A first bearing 2119a and a second bearing 2119b (see FIG. 6B) can be provided at both ends of the first rotary part 250. The first bearing 2119a can allow the first rotary part to rotate in the second housing, and the second bearing 2119b can be accommodated in the first housing to allow the first rotary part 250 to rotate. The first bearing 2119a and the second bearing 2119b can include a first bearing through-hole 2119c and a second bearing through-hole defined in the axial direction of the first burr. Accordingly, the coffee powder discharged through the first rotary part through-hole, the first burr inlet 2318 and the first burr outlet 2319 may not be interfered with by the first bearing 2119a and the second bearing 2119b.

The second housing 242 coupled to the first housing 241 and rotatably supporting the first rotary part 250 can include a whole bean introduction hole 2423 allowing whole beans to be introduced therethrough, and can further include a fixing shaft support 910 configured to support the fixing shaft inserted into the whole bean introduction hole 2423. In addition, the fixing shaft support 910 can be supported by at least one reinforcing rib 2422 connecting the inner surface of the whole bean introduction hole 2423 to the fixing shaft support 910.

The fixing shaft support 910 can be coupled to a fixing shaft 2128 arranged through the second burr to support the second burr 232 so as not to shake when the first burr 231 rotates.

For example, the fixing shaft support 910 can include a fixing shaft coupling groove 2421a (see FIG. 6B) into which the fixing shaft 2128 is inserted toward the first burr inlet 2318. When the second burr 232 is inserted into the grinding space 238 through the first burr outlet 2319, the fixing shaft 2128 can be inserted into the fixing shaft coupling groove 2421a through the first burr through-hole 2313.

The fixing shaft 2128 inserted into the fixing shaft coupling groove 2421a can be moved within the fixing shaft coupling groove 2421a in the axial direction of the first burr 231. Thereby, the distance between the first burr 231 and the second burr 232 can be adjusted to adjust the grinding degree.

The first grinder 211 can further include a second rotary part 260 accommodated in the housing body 2412 so as to be arranged closer to the first opening 2411a than the first rotary part 250, the second rotary part being connected to the burr coupler 2122 to move the second burr 232 inserted into the first burr 231 in the axial direction of the first burr to adjust the size of the grinding space 238.

The second rotary part 260 can convert force causing rotational motion into movement in the axial direction of the first bur. The second rotary part 260 can include elements capable of converting rotational motion into linear motion, such as a rack and a pinion or a bevel gear.

An example of the second rotary part 260 shown in FIG. 4A can include a ring-shaped rotating ring 261 configured to rotate, a rotating ring through-hole 2613 defined in the rotating ring 261 in the axial direction of the first burr 231, and a cylindrical guide 262 disposed in the rotating ring through-hole 2613, the cylindrical guide 262 having an accommodation space 2622 defined therein to be coupled to the burr coupler 2122.

The guide 262 can include accommodation space threads formed on an inner circumferential surface of the guide 262. As the burr coupler 2122 has the burr coupler thread 2122a formed on the outer surface thereof, the burr coupler 2122 can be screwed to the guide 262.

The grinder assembly 210 can be coupled to the coupling space 2811 of the support assembly 270. The support assembly 270 defining the coupling space 2811 can further include a grinder fixing part 281 providing an attachable coupling space for the first grinder 211, a gear cover 282 coupled to a side surface of the grinder fixing part 281 to protect the planetary gear part 2913 (see FIG. 4A), and a gear fixing part 283 connected to an upper portion of the gear cover 282 to support the first gear part 2915.

The grinder fixing part 281, the gear cover 282, and the gear fixing part 283 can be integrated with one another. For example, these elements can be provided as a single plastic item by injection molding. In some implementations, the grinder fixing part 281, the gear cover 282, and the gear fixing part 283 can be made of a metal material by a press process, or can be formed into a single grinder case 280 by a method such as welding or riveting.

The support assembly 270 can further include a driving unit 290 configured to transmit driving force to the grinder assembly 210. The driving unit 290 can be installed in the installation space 915 of the support 910 (see FIG. 1) and thus may not be exposed to the outside.

The driving unit 290 can include a first driving unit 291 configured to rotate the first rotary part 250 and a second driving unit 292 configured to drive the second rotary part 260. The first driving unit 291 can include a first gear part 2915 connected to the first rotary part 250 to rotate the first rotary part 250, and a first power part 2911 configured to transmit rotational power to the first gear part. A planetary gear part 2913 can be disposed between the first power part 2911 and the first gear part 2915 to transmit rotation of the first power part 2911 to the first gear part 2915 by reducing the rotational speed of the first power part 2911 to an appropriate speed.

The second driving unit 292 can include a second gear part 2925 connected to the second rotary part 260 to rotate the second rotary part 260, and a second power part 2921 configured to transmit rotational power to the second gear part 2925.

In some implementations, the controller can be provided in the support 910 or the base 920. The controller can be arranged anywhere as long as the control can control the water supplier 400, the extractor 600, and the grinder 200 of the coffee extraction apparatus 1000. When the whole bean supplier 100 configured to supply whole beans in the form of bean capsules is further provided, the controller can also control the whole bean supplier 100. The controller can independently control the first power part 2911 and the second power part 2921 to control the grinder 200. For example, the rotation of the first gear part 2915 can be independent from the rotation of the second gear part 2925.

The first gear part 2915 can rotate the first rotary part 250, thereby rotating the first burr 231. For example, the first gear part 2915 can serve to transmit the power required to grind whole beans. By way of further example, the second gear part 2925 can rotate the second rotary part 260 to move the second grinder 212 in the axial direction of the first burr 231.

Accordingly, after the second burr 232 is coupled to the second rotary part 260 by the burr coupler 2122 and inserted into the first burr 231, the second burr 232 can be finely adjusted inside the first burr 231 in the axial direction of the first burr 231 by rotation of the second rotary part 260 to adjust the grinding degree.

Accordingly, there is a large difference in power required for the first rotary part 250 for grinding beans and the second rotary part 260 for adjusting the grinding degree, and therefore the scale of the first power part 2911 to transmit power to the first rotary part 250 may be larger than the scale of the second power part 2921. For example, the scale of the first power part 2911 can refer that the torque or power of a first motor provided in the first power part 2911 is greater than that of a second motor provided in the second power part 2921.

As illustrated in FIG. 4A, the second driving unit 292 can be arranged on a lateral surface of the first driving unit 291. The second driving unit 292 can be fixed to a portion of the coupling space 2811 to rotate the second rotary part 260 (see FIG. 6A)

The first gear part 2915 may include a first main gear 2916 and a first subordinate gear 2917. The first subordinate gear 2917 may be connected to the first rotary part 250 provided in the first grinder 211.

The first gear part 2915 can further include a gear connection arm 2918 configured to connect and support the first main gear 2916 and the first subordinate gear 2917, and an elastic member 2919 connected to the gear connection arm 2918 to provide elastic force. The elastic member 2919 is can be fitted onto a first main gear shaft 2916a, which is a rotational shaft of the first main gear, and then fixed to the gear fixing part 283, which supports the first gear part 2915, to provide restoring force to the gear connection arm 2918.

In some implementations, as a feature of the swing-type idle gear, the first main gear can be connected to the first main gear shaft 2916a and thus connected to the first power part 2911 via the planetary gear part 2913. In addition, the first main gear shaft 2916a can be connected to the planetary gear part, and can only be allowed to rotate in position.

In some implementations, the first subordinate gear 2917, which is connected to the first main gear 2916, can rotate while revolving around an axis. A first subordinate gear shaft 2917a can be supported by the gear connection arm 2918 and serve to support rotation of the first subordinate gear 2917. The first subordinate gear shaft 2917a can move in the circumferential direction of the first main gear 2916 while supporting the rotation of the first subordinate gear. For example, the first subordinate gear 2917 can revolve around the first main gear 2916.

When the first main gear 2916 rotates in a first rotation direction, the first subordinate gear 2917 and the gear connection arm 2918 can be rotated in a second rotation direction and connected to the first rotary part 250 to rotate the first rotary part in the first rotation direction. When the first main gear 2916 does not rotate, the gear connection arm 2918 and the first subordinate gear 2917 can be rotated in the first rotation direction and separated from the first rotary part by the restoring force of the elastic member 2919.

For example, the restoring force of the elastic member 2919 can be designed to be less than the rotational power of the first main gear 2916 that rotates the rotational shaft of the first subordinate gear or the gear connection arm. Thus, only when the first main gear 2916 does not rotate, the restoring force can be transmitted to the first subordinate gear through the gear connection arm in the opposite direction to separate the first subordinate gear from the first rotary part.

The elastic member 2919 can be a torsion spring coupled to the first main gear shaft 2916a and fixed to the gear fixing part 283. Any elements capable of connecting the first subordinate gear 2917 to the first rotary part when the first main gear 2916 rotates and separating the first subordinate gear 2917 from the first rotary part 250 when the first main gear 2916 stops can be provided in place of the elastic member. For example, the same function can be performed using an actuator in place of the elastic member.

Thereby, it may be ensured that the first subordinate gear 2917 is always connected to the first rotary part when rotating. For example, even when repulsive force or vibration caused by an impact occurring during grinding of the whole beans on the first rotary part is momentarily transmitted in the opposite direction to the first subordinate gear 2917, the gear connection arm 2918 can freely rotate, and the rotational power of the main gear 2916 can keep the first subordinate gear 2917 connected to the first rotary part 250.

Thus, the impact transmitted from the first rotary part 250 to the first main gear shaft 2916a or the first power part 2911 through the first main gear 2916 can be minimized, and accordingly the impact transmitted to the first gear part 2915, the planetary gear part 2913 and the first power part 2911 can be limited.

For example, the first subordinate gear shaft 2917a can revolve around the first main gear shaft 2916a while being spaced apart from the first main gear shaft 2916a by a certain distance by the gear connection arm 2918.

In some implementations, when the first main gear 2916 rotates in a first rotation direction, the first subordinate gear 2917, the first subordinate gear shaft 2917a, and the gear connection arm 2918 can rotate in a second rotation direction opposite to the first direction.

The first grinder 211 can further include a first housing 241 configured to accommodate the first rotary part 250 and support the first rotary part. As described above, the first housing 241 can include a housing body 2412 defining a space to accommodate the first rotary part 250, a first opening 2411a provided in the housing body 2412 and opened at one end facing the extractor 600, a second opening provided in the housing body 2412 and opened an opposite end facing away from the extractor 600, a first communication hole 2413a formed through the housing body 2412 in a radial direction of the first rotary part 250, and a second communication hole 2413b formed through the housing body 2412 in a radial direction of the second rotary part 260.

The first rotary part 250 can be rotatably connected to the first gear part 2915 through the first communication hole 2413a. Similarly, the second rotary part 260 can be rotatably connected to the second gear part 2925 through the second communication hole 2413b.

Accordingly, as shown in FIG. 4A, the first communication hole 2413a can be positioned at a different height from the second communication hole 2413b. This is because the first rotary part 250 and the second rotary part 260 are arranged at different heights. In some implementations, the second driving unit is arranged biased to one side of the coupling space 2811 (see FIG. 6A), and accordingly the radial direction of the first rotary part 250 provided with the first communication hole 2413a can differ from the radial direction of the second rotary part 260 provided with the communication hole 2413b. For example, even when it is assumed that the first communication hole 2413a and the second communication hole 2413b are in the same plane, a straight line formed by the first communication hole 2413a around the first burr, and a straight line formed by the second communication hole 2413b can form a certain angle.

Accordingly, since the first and second rotary parts 250 and 260 are installed at different positions, and the first gear part 2915 and the second gear part 2925 are installed at different positions, the first communication hole 2413a and the second communication hole 2413b can be formed at different positions in the housing body 2412. The sizes of the first communication hole 2413a and the second communication hole 2413b can also be different from each other. The directions in which each of the first communication hole 2413a and the second communication hole 2413b faces the outside from the housing body can also be different from each other.

Figure 4B:
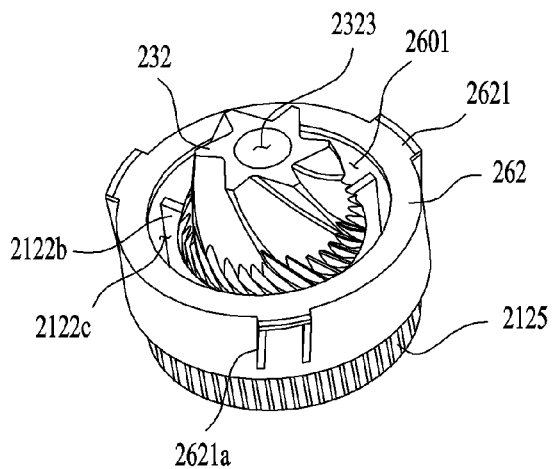
FIG. 4B is a diagram illustrating an exemplary of a second grinder and a guide coupled to each other.

FIG. 4B is a diagram illustrating an example of the second grinder 212 and the guide 262 coupled to each other. The guide 262 can include a first through-hole 2601 and a second through-hole 2602 formed to define an accommodation space 2622 to accommodate a portion of the second grinder 212 and connected to the accommodation space 2622. The first through-hole 2601 can be positioned on the side close to the first burr 231, and the second through-hole 2602 can be positioned on the side opposite to the first through-hole 2601. A portion of the second grinder 212 can be inserted through the second through-hole 2602, and be inserted into the first burr 231 through the first through-hole 2601.

The inner circumferential surface of the guide 262 defining the accommodation space 2622 can be provided with an accommodation space thread 2262a having a thread shape to couple the burr coupler 2122 to the accommodation space 2622. The outer circumferential surface of the burr coupler can also be provided with a burr coupler thread 2122a having a thread shape. Thus, the burr coupler thread 2122a and the accommodation space thread 2262a can be screw-coupled to each other. In some implementations, the burr coupler thread 2122a and the accommodation space thread 2262a can be loosened to separate the guide from the burr coupler when the apparatus is not in use or needs to be cleaned.

Accordingly, the first grinder 211 and the second grinder 212 can be separable from each other. For example, the first burr 231 and the second burr 232 can be separable from each other. By way of further example, the first grinder 211 and the burr coupler 2122 can be separable from each other. Accordingly, the first grinder 211 and the second burr 232 can be coupled when in use and can be separated when they are not in use or when they need to be cleaned. For example, the first grinder and the second burr 232 can be selectively separated.

The guide 262 can include a plurality of guide protrusions 2621 extending from one end thereof including the first through-hole 2601. The plurality of guide protrusions 2621 can be provided on an arc including the first through-hole 2601 at constant intervals. The guide protrusions 2621 can be provided as a single integrated guide protrusion. The plurality of guide protrusions 2621 can couple the guide 262 to the rotating ring 261 through a rotating ring thread 2612a provided on the rotating ring inner circumferential surface 2612.

The guide protrusions 2621 can be provided with a protrusion stopper 2621a to reinforce the guide protrusions 2621 and block the guide from rotating. The protrusion stopper 2621a can have a rib shape extending from the guide protrusion 2621 toward the extractor 600. When the second rotary part 260 rotates, the protrusion stopper 2621a can cause the rotating ring 261 to rotate. At this time, however, the guide 262, which is screwed to the inner circumferential surface of the rotating ring, can move in place in the axial direction of the first bur.

The second burr 232 can include a second burr through-hole 2323 formed through the second burr 232. A fixing shaft 2128 can be coupled to the second burr through-hole 2323 in a penetrating manner.

The burr coupler 2122, which supports the second burr 232 and couples the second burr 232 to the first grinder, can be partially accommodated in the accommodation space 2622 together with the second burr 232.

The burr coupler 2122 can include an installation hole 2122c formed therethrough in the axial direction of the first burr. The second burr 232 can be installed in the second burr installation hole 2122c. The second burr 232 can further include a burr coupler support rib 2122b connected to the inner circumferential surface of the second burr installation hole 2122c to support the second burr 232. The installation hole can be provided because the coffee powder discharged through the first burr outlet falls into the accommodation space of the guide, and a portion of the coffee powder can be discharged to the extractor 600 through the installation hole 2122c. Accordingly, the handle 2125 can also have a ring shape.

Thus, the movement path of the discharged coffee powder can only have through-holes and some ribs, and therefore coffee powder accumulated in an area other than the extractor can be minimized.

The coffee extraction apparatus 1000 can have the path, through which the ground beans pass through the grinder 200, that is simplified and minimized. The grinder 200, can employ a conical burr, allow the outer burr (the first bur), not the center burr, to rotate, and thus does not position the driving unit in the discharge area of the coffee powder. Thus, when gravity acts on the coffee extraction apparatus 1000, the coffee powder can be discharged directly to the extractor 600 without interference because there is no driving device except multiple holes in the path through which the coffee powder is discharged. Accordingly, the coffee powder wasted or accumulated in the grinder 200 to cause contamination can be minimized.

Figure 5:
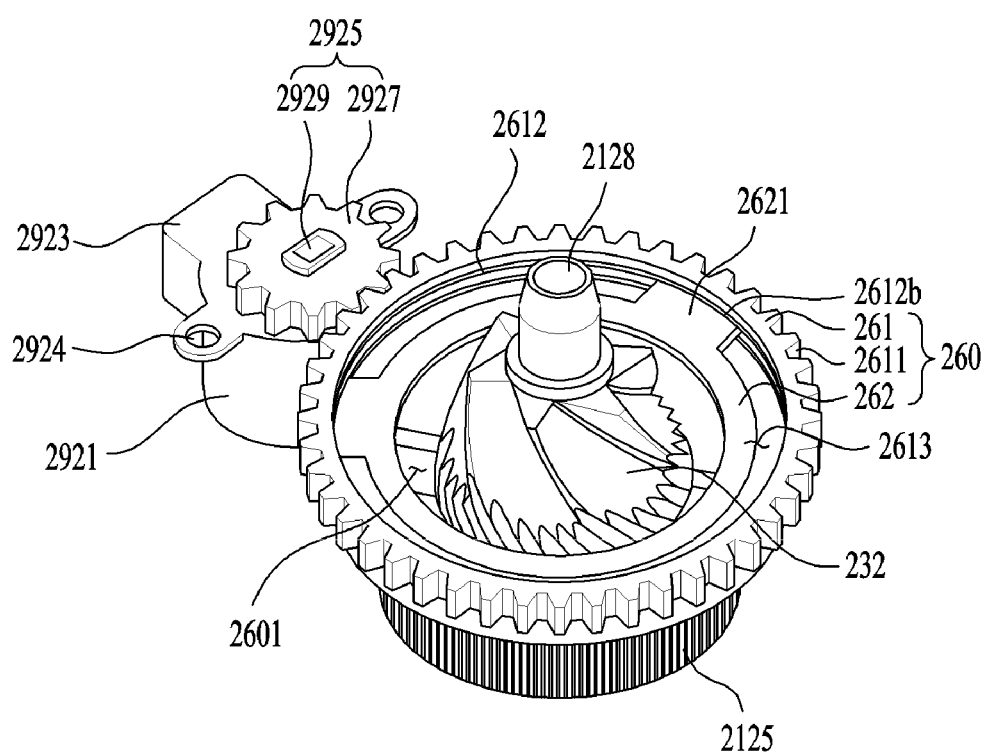
FIG. 5 is a diagram illustrating an example of a second rotary part, a second gear part, and a second grinder coupled to one another.

FIG. 5 is a diagram illustrating an example of the second rotary part, the second grinder 212, and the second driving unit 292 coupled to one another. The second driving unit 292 can include a second gear part 2925 and a second power part 2921. When a second gear shaft 2929 is rotated by rotation of the second power part 2921, a second gear 2927 coupled to the second gear shaft 2929 can rotate. When the second gear 2927 rotates, the rotating ring 261 of the second rotary part 260 can rotate.

The rotating ring 261 can include a rotating ring through-hole 2613 formed therethrough in a ring shape in the axial direction of the first burr. Gear teeth can be provide on a rotating ring outer circumferential surface 2611, which is the outer circumferential surface of the rotating ring 261, at a position corresponding to the second gear 2927, and thus the rotating ring 261 can engage with the second gear 2927. A rotating ring inner circumferential surface 2612, which is the inner circumferential surface of the rotating ring 261, can be provided with a rotating ring thread 2612a in the form of a screw thread, and thus the guide protrusion 2621 can be screwed thereto.

Figure 9:
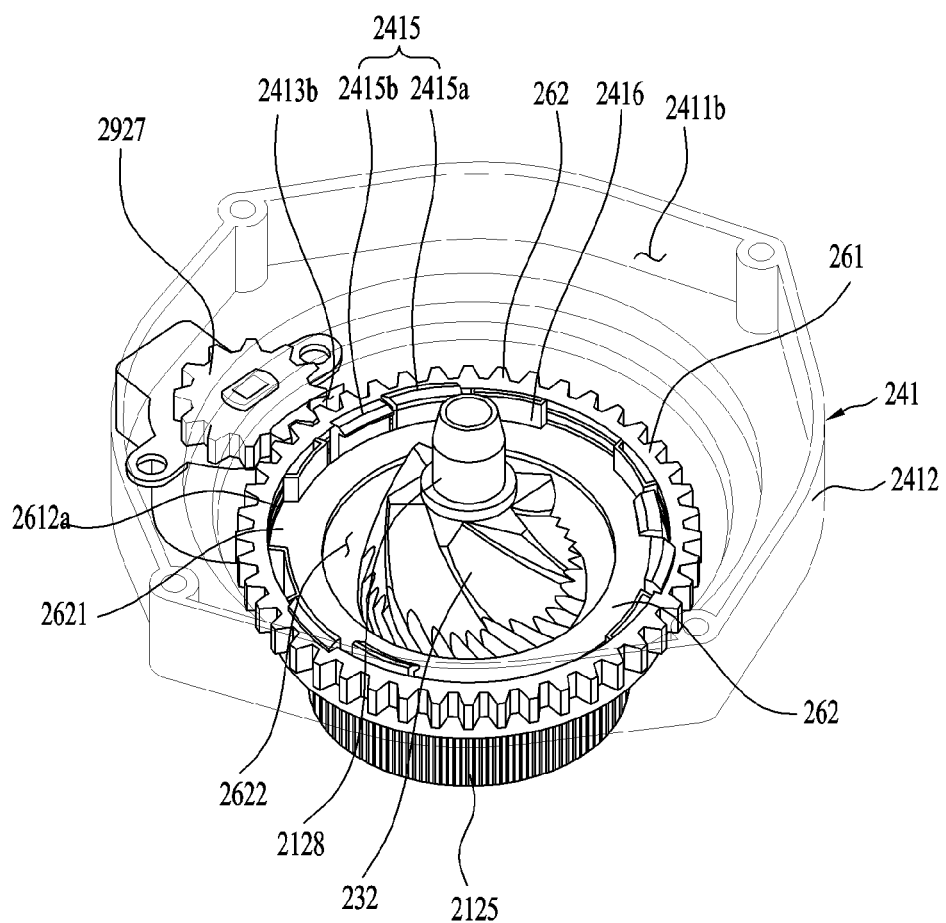
FIG. 9 is a diagram illustrating an exemplary second rotary part.

The rotating ring 261 and the guide 262 can be fixed by a plurality of second rotary part supports 2415 and a plurality of guide fixing parts 2416 extending from the housing body 2412, respectively (see FIG. 9). When the rotating ring 261 is rotated by the protrusion stopper 2621a shown in FIG. 4B, the guide 262 may not rotate along the rotating ring thread 2612a, but can move in the axial direction of the first burr. Accordingly, using this operation, the distance between the first burr 231 and the second burr 232 can be adjusted, that is, the size of the grinding space can be adjusted to adjust the size of the ground coffee powder.

The second driving unit 292 can be coupled to one side of the coupling space 2811 through a driving coupler 2923 and a driving fastener 2924.

Figure 6A:
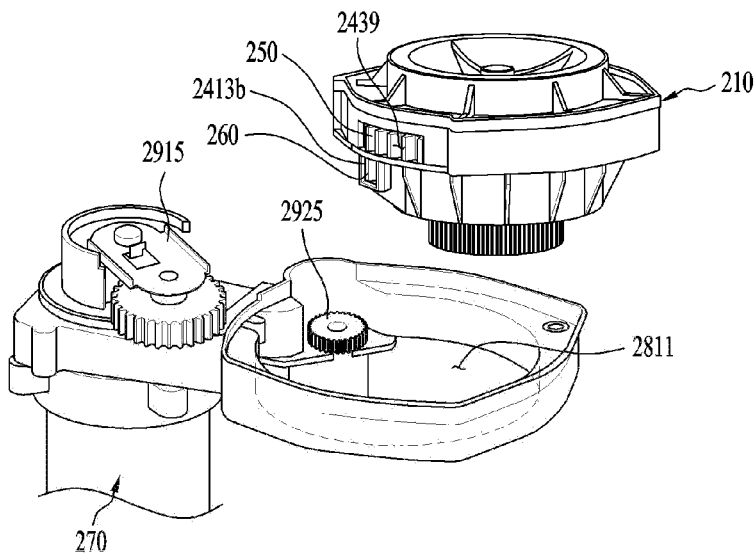
FIG. 6A is a diagram illustrating an example of a grinder assembly separated from a support assembly.

FIG. 6A is a diagram illustrating the grinder assembly 210 separated from the support assembly 270. For example, when used, the grinder assembly 210 can be coupled to the coupling space 2811. When it is not in use or needs to be cleaned, the grinder assembly 210 can be separated. After the separation, the first burr 231 and the second burr 232 can be exposed, respectively, and can be easily cleaned using a cleaning brush.

When the grinder assembly 210 is coupled to the coupling space 2811 defined in the grinder fixing part 281, it can be engaged with the gear teeth of the first gear part 2915, the first rotary part, the second gear part, and the second rotary part. To this end, the first rotary part 250 and the second rotary part 260 can be connected to the first gear part 2915 and the second gear part 2925 through the first communication hole 2413a and the second communication hole 2413b, respectively.

Figure 6B:
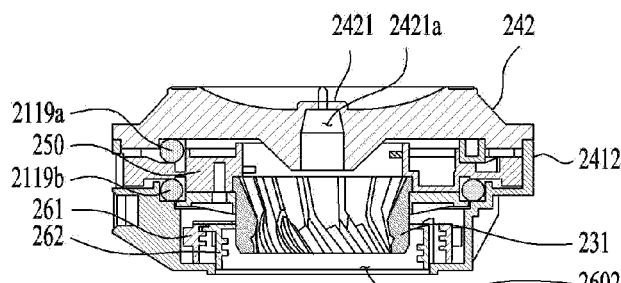
FIG. 6B is a diagram illustrating an example of the second grinder coupled to or separated from a first grinder.

FIG. 6B is a diagram illustrating the first grinder 211 and the second grinder 212 separated from each other. The second grinder 212 can include a second burr 232, a burr coupler 2122 coupled to the second burr 232, a fixing shaft 2128 arranged through the second burr 232 and the burr coupler 2122 in the axial direction of the first burr, and a handle 2125 coupled to the burr coupler 2122 to provide a gripping portion.

The first grinder 211 can include a first burr 231, a first rotary part 250 configured to rotate the first burr, a first bearing 2119a and a second bearing 2119b rotatably coupled to the first rotary part, a guide 262 coupled to the burr coupler 2122, and a rotating ring 261 configured to move the guide in the axial direction of the first burr to adjust the grinding degree. The second rotary part 260 can be located closer to the first burr outlet 2319 than the first rotary part 250.

The first grinder 211 can include a first housing 241 configured to accommodate the first burr 231, the first rotary part 250 including the bearing part, and the second rotary part 260, and a second housing 242 coupled to the first housing 241. The second grinder 212 can be inserted through the first opening 2411a and the second through-hole 2602, and thus the second burr 232 can be inserted into the first burr through-hole 2313. An example of the inserted second burr is shown in FIG. 6C.

Figure 6C:
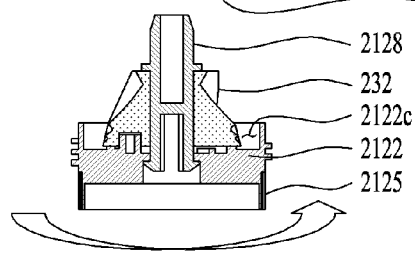
FIG. 6C is a diagram illustrating an example of a cross section of a guide and a rotation ring of the second rotary part.
Figure 6C:
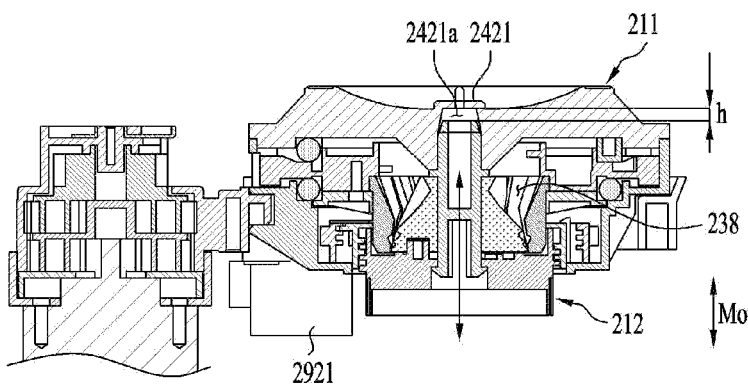

FIG. 6C is a diagram illustrating that the second burr 232 is inserted into the first burr through-hole 2313, and the fixing shaft 2128 is inserted into and supported by the fixing shaft coupling groove 2421a. The distal groove end of the fixing shaft coupling groove 2421a can be spaced apart from the inserted end of the fixing shaft 2128 by a distance of h. This is because the groove does not completely fix the fixing shaft 2128, but supports the circumferential surface of the fixing shaft 2128. In some implementations, the gap space can be changed as the guide 262 moves in the axial direction (indicated by an arrow) of the first burr when the second rotary part 260 rotates. For example, in order to set the grinding degree, the depth by which the fixing shaft 2128 is inserted can be adjusted. Thereby, the size of the grinding space 238 can be adjusted. For example, the gap distance between the first burr 231 and the second burr 232 can be adjusted. By way of further example, the gap between the first burr blade 2316 and the second burr blade 2326 may be adjusted (see FIG. 3).

FIG. 7 is a diagram illustrating an example of the first gear part 2915 and the first rotary part 250. The first driving unit 291 can include the first gear part 2915 and the first power part 2911. The rotational power of the first power part 2911 can be transmitted to the first main gear 2916 through the planetary gear part 2913 and the first main gear shaft 2916a connected to the planetary gear part 2913. The first subordinate gear 2917 can be positioned between the first main gear 2916 and the first rotary part 250. The first subordinate gear 2917 can engage with the first main gear 2916 and rotate in a direction opposite to the rotation direction of the first main gear 2916.

The first main gear shaft 2916a can rotate the first main gear 2916. The first main gear 2916 can be included in the gear fixing part 283. The first main gear shaft 2916a can be arranged through the gear fixing part 283 such that a portion of the first main gear shaft 2916a can be exposed to the outside. A gear connection arm 2918 connecting the first main gear 2916 and the first subordinate gear 2917 can be rotatably coupled to the portion of the first main gear shaft 2916a exposed to the outside. In addition, an elastic member can be coupled to the first main gear shaft 2916a.

The first subordinate gear shaft 2917a can be connected to the gear connection arm 2918 at a position on the side opposite to the side at which the gear connection arm 2918 and the first main gear shaft 2916a are connected. Unlike the first gear shaft 2916a, the first subordinate gear shaft 2917a can be connected only to the gear connection arm 2918, and thus the first subordinate gear shaft 2917a can be supported by the gear connection arm 2918. For example, the first main gear 2916 can be supported at both ends of the first main gear shaft 2916a, while the first subordinate gear 2917 can be supported only at one end of the first subordinate gear shaft 2917a to which the gear connection arm 2918 is connected.

Accordingly, the first main gear 2916 can rotate only at a fixed position where the first main gear shaft 2916a is fixed, while the first subordinate gear shaft 2917a can rotate around the first main gear shaft 2916a as the first subordinate gear 2917 is connected to the gear connection arm 2918. For example, while the first subordinate gear 2917 is rotated by the rotation of the first main gear 2916 through gear teeth engagement, the first subordinate gear shaft 2917a can move (revolve) around the first main gear 2016 in the circumferential direction of the first main gear 2016.

Accordingly, when the first main gear 2916 rotates, both the gear connection arm 2918 and the first subordinate gear can rotate to engage with the first rotary part to transmit rotational power. When the first main gear 2916 rotates in a first rotation direction opposite to the clockwise direction, the first subordinate gear 2917 can rotate in a second rotation direction opposite to the first rotation direction. In some implementations, the gear connection arm can rotate in the first rotation direction due to the revolution of the first subordinate gear, and be engaged with gear teeth that can be provided on the first rotary part outer circumferential surface 250a. Then, the first rotary part 250 can rotate.

For example, the first main gear 2916 can only be allowed to rotate on its own axis, and the first subordinate gear 2917 can perform both rotation and revolution.

The first rotary part 250 can be rotatably accommodated in the housing body 2412. As described above, the first rotary part through-hole 2501 formed through the first rotary part 250 in the axial direction can be coupled to communicate with the first burr through-hole 2313. The first rotary part outer circumferential surface 250a can have gear teeth. The gear teeth can engage with the first subordinate gear 2917. The first rotary part 250 can be coupled to the first burr 231 to rotate the first burr 231. In FIG. 7, the first rotary part 250 can be positioned closer to the second opening 2411b than the first burr 231.

In addition, the second burr 232 can be inserted into the first burr 231 and the fixing shaft 2128 can be inserted into the second burr through-hole 2323.

The elastic member 2919 can be rotatably coupled to the first main gear shaft 2916a. One end of the elastic member 2919 can be fixed to the gear fixing part 283, the opposite end of the elastic member 2919 can be connected to the gear connection arm 2918. When the first main gear 2916 rotates in the first rotation, the elastic member 2919 fixed to the gear fixing part 283 can provide elastic force in the second rotation direction, which is the opposite direction. Accordingly, when the first main gear 2916 does not rotate, the first gear part 2915 can be separated from the first rotary part 250 due to the restoring force applied by the elastic member 2919.

In some implementations, when the first main gear 2916 rotates in the first rotation direction, the first subordinate gear shaft 2917a can move around the first main gear shaft 2916a along the circumference of the first main gear 2916 in the first rotation direction such that the first subordinate gear 2917 engage with the first rotary part 250, overcoming elastic force.

For example, when the first main gear 2916 rotates in the first rotation direction, the gear connection arm 2918 can rotate in the first rotation direction, and the first subordinate gear 2917 can rotate in the second rotation direction to be connected to the first rotary part 250. When the first main gear 2916 is stopped, the gear connection arm 2918 can be rotated in the second rotation direction by the elastic member 2919, thereby releasing the connection between the first subordinate gear 2917 and the first rotary part 250.

FIGS. 8A and 8B are diagrams illustrating an operation mechanism of the first gear part 2915. FIG. 8A is a diagram illustrating the state and position of the first gear part 2915 and the force applied by the elastic member when the first driving unit 291 is not driven. When the first power part 2911 is not driven, the first main gear 2916, the first subordinate gear 2917, and the first rotary part 250 do not rotate. For example, the first subordinate gear 2917 can be at the initial position of the first subordinate gear, which is spaced apart from the first rotary part 250 by a predetermined distance.

After the first gear part 2915 is rotated, that is, when grinding is completed through rotation of the first rotary part 250, the first subordinate gear shaft 2917a supported by the gear connection arm 2918 can be moved away from the first rotary part 250 by the elastic member 2919 in the circumferential direction of the first main gear 2916. Accordingly, the first subordinate gear shaft 2917a can rotate away from the first rotary part 250 along the first main gear shaft 2916a.

FIG. 8B is a diagram illustrating the first main gear 2916, the first subordinate gear 2917, the gear connection arm, the rotation direction of the first rotary part, and the force applied by the elastic member when the first driving unit 291 rotates in the first rotation direction, for example, counterclockwise. Unlike FIG. 8A, when the first power part 2911 operates, the first main gear 2916 can rotate. For example, when the first main gear 2916 rotates in the first rotation direction, for example, a counterclockwise direction indicated by an arrow above the first main gear in the figure, the first subordinate gear 2917 can engage with the first main gear 2916, and accordingly can rotate in the second rotation direction opposite to the first rotation direction, e.g., clockwise. This rotational motion can be caused by the rotation of the first subordinate gear 2917.

In some implementations, when the first subordinate gear 2917 rotates, the first subordinate gear shaft 2917a supported by the gear connection arm 2918 can rotate in the same rotation direction as the first main gear 2916. Because the gear connection arm 2918 only supports the first subordinate gear shaft 2917a to rotate, while the first subordinate gear 2917 rotates in the second rotation direction, the gear connection arm 2918 can rotate in the direction opposite to the rotation direction of the first subordinate gear 2917. Accordingly, when the first main gear 2916 rotates in the first rotation direction, the first subordinate gear 2917 can rotate (on its own axis) in the second rotation direction, while the first subordinate gear shaft 2917a can move (revolve) in the first rotation direction. Accordingly, the gear connection arm can also rotate in the first rotation direction. The rotational power of the gear connection arm 2918 according to the first main gear 2916 and the first subordinate gear 2917 should be greater than the restoring force applied by the elastic member 2919. This is because the gear connection arm 2918 should overcome the restoring force applied by the elastic member 2919 and rotate such that the first subordinate gear 2917 is connected to the first rotary part 250.

The first rotary part 250 can engage with gear teeth provided on the first rotary part outer circumferential surface 250a. Thereby, the rotational power of the first power part 2911 can be transmitted through the planetary gear part 2913, the first main gear 2916 and the first subordinate gear 2917.

This structure can reduce the impact and vibration transmitted when whole beans are ground. If the first gear part 2915 is directly coupled to the first rotary part 250 without the first subordinate gear 2917, the impact generated when the whole beans are grounded can be transmitted to the first gear part 2915 through the first rotary part 250. Accordingly, the first subordinate gear 2917, which serves as an idle gear, can be required to perform a function of reducing the impact to the first main gear 2916. In addition, since the first subordinate gear 2917 is allowed to revolve by the gear connection arm 2918, the impact on the first subordinate gear 2917 can be absorbed through the gear connection arm 2918. For example, the grinding impact may not be transmitted to the first main gear 2916 through the gear connection arm, but can be absorbed by the gear connection arm 2918 rotating in the opposite direction, for example, the second rotation direction. As a result, the impact can be reduced and vibration can be limited.

For example, when the driving force of the first power part 2911 is transmitted to the first rotary part 250 through a swing type idle gear as in the implementation shown in FIG. 7, the impact according to grinding of the whole beans can be reduced. Thereby, vibration can be reduced. The impact according to grinding of the whole beans can be generated in the grinder assembly 210 and transmitted to the first power part 2911 through the first gear part 2915. However, because the shaft of the idle gear can be in an unrestricted state, the impact can be absorbed by the swing of the idle gear. Unlike the first main gear shaft 2916a, the first subordinate gear shaft 2917a is not fixed to a frame such as the gear fixing part 283. Accordingly, large impacts generated from the grinder assembly 210 can be limited from being directly transmitted to cause vibration.

When the first rotary part 250 is directly connected to the first main gear 2916 without the first subordinate gear 2917, an issue related to positional accuracy may be raised. In the coffee extraction apparatus 1000, the first grinder 211 and the second grinder 212, more specifically, the first burr 231 and the second burr 232 are configured to be separated from each other to improve cleaning performance. To this end, the grinder assembly 210 must be detachable from the support assembly 270.

Accordingly, if the first rotary part 250 and the first main gear 2916 are directly connected, the gear teeth provided on the first rotary part outer circumferential surface 250a and the gear teeth of the first main gear 2916 are likely to hit each other to be damaged every time they are attached and detached. In order to limit such damage, the first gear part 2915 can include the first subordinate gear 2917, the gear connection arm 2918, and the elastic member 2919 in addition to the first main gear 2916. Accordingly, when the gear part 2915 does not rotate, the first gear part 2915 can be separated from the first rotary part 250 to limit collision between the gear teeth as described above.

As such, the elastic member 2919 can employ a torsion spring or the like. For example, the restoring force of the torsion spring should not obstruct the first subordinate gear 2917 from being connected to the first rotary part 250 when the whole beans are ground, and should be sufficient to separate the first subordinate gear 2917 from the first rotary part 250 when the whole beans are not grounded.

Any mechanical connection capable of connecting and releasing the first gear part 2915 to and from the first rotary part 250 can be used in place of the elastic member 2919. For example, before the grinder assembly 210 is separated, the first gear part 2915 can be manually separated from the first rotary part 250.

FIG. 9 is a diagram illustrating an example of the second rotary part 260. Taste of coffee is determined by many factors including freshness of coffee, temperature and type of water, and extraction method. Among such factors, grinding is one of the most important factors in the coffee extraction process. Grinding is a process to increase the area for coffee extraction by grinding beans. This is because when coffee is extracted through the grinding operation, various coffee ingredients can dissolve in water more easily, affecting the coffee flavor. Accordingly, the operation of changing the particle size of individual coffee powder grains, that is, coffee particles, through grinding may be referred to as adjustment of the grinding degree.

The second rotary part 260 can be configured to adjust the grinding degree. Specifically, the second rotary part 260 can be connected to the burr coupler 2122 and can rotate to move the burr coupler 2122 in the axial direction of the first burr 231 to adjust the depth by which the second burr 232 is inserted into the first burr 231.

The second rotary part 260 can be any structure capable of performing linear motion through rotation, such as a bevel gear, a linear motor, or a pinion. For example, when the second rotary part 260 rotates, the second burr 232 can move in the axial direction of the first burr 231 within the grinding space 238 to adjust the size of the grinding space 238. The movement of the second burr 232 can refer to the movement of the burr coupler 2122, which in turn refers to the movement of the second grinder 212. Accordingly, by adjusting the distance between the first burr blade 2316 and the second burr blade 2326, the size which the whole beans are grounded can be adjusted.

For example, the second burr 232 inserted into the first burr 231 can adjust the depth L by which the fixing shaft 2128 is inserted into the fixed-shaft coupling groove 2421a (see FIG. 6B).

FIG. 9 is a diagram illustrating a second rotary part 260 having a double ring structure as an example of the second rotary part 260. First, the second rotary part 260 can be accommodated in the housing body 2412, and be positioned closer to the first opening 2411a than the first rotary part 250.

In the housing body 2412, the second opening 2411b can be larger than the first opening 2411a. This is because the outer diameter of the first rotary part 250 can be larger than the outer diameter of the second rotary part 260. Because the first rotary part 250 configured to rotate the first burr 231 needs a much greater torque, the outer diameter of the first rotary part 250 must be as large as possible. In some implementations, the second rotary part 260 does not require a large force because it is only necessary to adjust the grinding degree by moving the inserted second burr 232 slightly in the axial direction of the first burr 231. Accordingly, the housing body 2412 can have a curved shape according to a space accommodating the first rotary part 250 and the second rotary part 260.

The second rotary part 260 accommodated as above can further include a rotating ring 261 connected to the second driving unit 292 so as to rotate, a rotating ring through-hole 2613 through the rotating ring 261 in an axial direction of the first burr 231, a cylindrical guide 262 arranged in the rotating ring through-hole 2613 and having an accommodation space 2622 defined therein to be coupled with the burr coupler 2122, and a first through-hole 2601 formed through one surface of the guide 262 on the side close to the first burr inlet 2318 to communicate with the accommodation space 2622. The second burr 232 can be inserted into the first burr 231 through the first through-hole 2601.

For example, the second rotary part 260 can have a dual structure, and can include the rotating ring 261 rotatably connected to the second gear 2927, and the guide 262 inserted into the rotating ring to move in the axial direction of the first burr 231. The rotating ring 261 can include the rotating ring through-hole 2613 formed through the rotating ring in the axial direction of the first burr 231. The guide 262 can be inserted into the rotating ring through-hole 2613.

Gear teeth can be provided on the rotating ring outer circumferential surface 2611, which is the outer circumferential surface of the rotating ring 261, at a position corresponding to the second gear 2927, and the rotating ring 261 can engage with the second gear 2927 through the second communication hole 2413b. The rotating ring inner circumferential surface 2612, which is the inner circumferential surface of the rotating ring 261, can be provided with a rotating ring thread 2612a in the form of a screw thread, and thus can be screw-coupled to the guide 262.

The guide 262 can be inserted into the rotating ring through-hole 2613. As described above, in order to be coupled with the rotating ring thread 2612a, the guide 262 can include a plurality of guide protrusions 2621 formed on the outer circumferential surface of the guide to extend away from the center thereof in a radial direction. When the plurality of guide protrusions 2621 is coupled to the rotating ring screw thread 2612a, and the rotating ring 261 rotates, the plurality of guide protrusions 2621 can move the guide 262 in the axial direction of the first bur.

The plurality of guide protrusions 2621 can be provided on an arc including the first through-hole 2601 at constant intervals. The guide protrusions 2621 can be provided as a single integrated guide protrusion. The plurality of guide protrusions 2621 can couple the guide 262 to the rotating ring 261 through a rotating ring thread 2612a provided on the rotating ring inner circumferential surface 2612.

The second rotary part 260 can further include formed through one surface of the guide 262 on the side facing away from the first burr inlet 2318 to communicate with the accommodation space 2622. The coffee powder discharged through the first burr outlet 2319 can be discharged to the extractor 600 through the second through-hole 2602.

For example, the guide 262 can include a first through-hole 2601 and a second through-hole 2602 formed to define an accommodation space 2622 to accommodate a portion of the second grinder 212 and connected to the accommodation space 2622. The first through-hole 2601 can be positioned closer to the first burr 231 than the second through-hole 2602, and the second through-hole 2602 can be positioned on the side opposite to the first through-hole 2601. A portion of the second grinder 212 can be inserted through the second through-hole 2602, and be inserted into the first burr 231 through the first through-hole 2601.

A portion of the second burr 232 and one end of the fixing shaft 2128 can protrude through the first through-hole 2601, and the burr coupler may not protrude through the first through-hole. This is intended to ensure efficient installation in a narrow space in consideration of the sizes of the first through-hole 2601 and the first burr through-hole 2313.

The guide 262 can include an accommodation space thread 2262a, and the burr coupler 2122 can include a burr coupler thread 2122a formed on the outer surface of the burr coupler 2122. Thus, the burr coupler 2122 can be screwed to the guide 262.

For example, the inner circumferential surface of the guide 262 defining the accommodation space can be provided with an accommodation space thread 2262a having a thread shape to couple the burr coupler 2122 to the accommodation space 2622. The outer circumferential surface of the burr coupler 2122 can also be provided with a burr coupler thread 2122a having a thread shape. Thus, the burr coupler thread 2122a and the accommodation space thread 2262a can be screw-coupled to each other. The burr coupler thread 2122a and the accommodation space thread 2262a can be loosened to separate the guide from the burr coupler when the apparatus is not in use or needs to be cleaned.

Accordingly, the first grinder 211 and the second grinder 212 can be separable from each other. Specifically, the first burr 231 and the second burr 232 can be separable from each other. For example, the first grinder 211 and the burr coupler 2122 can be separable from each other. Accordingly, the first grinder 211 and the second burr 232 can be coupled when in use and can be separated when they are not in use or when they need to be cleaned. For example, the first grinder and the second burr 232 can be selectively separated.

The guide protrusions 2621 can be provided with a protrusion stopper 2621a (see FIG. 4B) to reinforce the guide protrusions 2621 and block the guide from rotating. The protrusion stopper 2621a can have a rib shape extending from the guide protrusion 2621 toward the extractor 600. When the second rotary part 260 rotates, the protrusion stopper 2621a can cause the rotating ring 261 to rotate. At this time, however, the guide 262, which is screwed to the inner circumferential surface of the rotating ring, can be obstructed from rotating by the protrusion stopper 2621a and move in place only in the axial direction of the first bur.

To this end, the rotating ring 261 and the guide 262 can be supported by a second rotary part support 2415 extending from the housing body 2412, respectively. The second rotary part support 2415 can include a rotating ring support 2415a configured to support the rotating ring and a guide support 2415b configured to support the guide.

Specifically, the second rotary part 260 can further include a rotating ring support 2415a extending from a portion of a portion of the housing body 2412 in a direction from the first opening 2411a toward the second opening 2411b to rotatably support the rotating ring 261 on the housing body 2412, and a guide support 2415b configured to support the guide 262.

The second rotary part 260 can further include a guide fixing part 2416 formed by extending a portion of the housing body 2412 in a direction from the first opening 2411a toward the second opening 2411b to limit rotation of the guide 262 and guide movement of the guide 262 in the axial direction of the first burr 231.

When necessary, a plurality of rotating ring support 2415a, a plurality of guide supports 2415b, and a plurality of guide fixing parts 2416 can be provided. The rotating ring supports 2415a, the guide supports 2415b, and the guide fixing parts 2416 can be arranged in a space between the rotating ring through-hole 2613 and the outer circumferential surface of the guide 262.

The extended length of the guide protrusion 2621 extending from a portion of the outer circumferential surface of the guide 262 can screw-couple the guide 262 to the rotating ring thread 2612a, but the outer circumferential surface of the guide 262 can be smaller than the diameter of the rotating ring through-hole 2613. Accordingly, a predetermined gap is present between the rotating ring through-hole 2613 and the outer circumferential surfaces of the guide 262 except for positions where the plurality of guide protrusions 2621. The rotating ring support 2415a, the guide support 2415b, and the guide fixing part 2416 can be arranged in the gap.

The rotating ring support 2415a and the guide support 2415b can be hook-coupled to the guide 262 and the rotating ring 261, respectively. For hook coupling, the hook direction of the rotating ring support 2415a can be opposite to the hook direction of the guide support 2416b. The rotating ring support 2415a can support the rotating ring 261 by pushing the rotating ring 261 inside and out, while the guide support 2415b pushes and fix the outer circumferential surface of the guide 262 toward the first through-hole 2601, i.e., inwardly. In some implementations, rotating ring 261 and the guide 262 can be supported in a different manner.

The guide fixing part 2416 can be positioned adjacent to the plurality of guide protrusions 2621. For example, one guide protrusion 2621 can be positioned between the guide fixing parts 2416. Accordingly, when the rotating ring 261 rotates, the guide 262 can be obstructed from rotating. Accordingly, when the rotating ring 261 is rotated, the guide protrusions 2621 screw-coupled to the rotating ring thread 2612a can be moved in the axial direction of the first burr according to rotation of the rotating ring.

For example, when the rotating ring 261 is rotated by the rotation of the second gear, the guide 262 can move along the rotating ring thread 2612a in the axial direction of the first burr instead of rotating. Thus, the movement of the guide 262 can refer to moving the burr coupler 2122 coupled through the accommodation space thread 2622a, and the movement of the burr coupler 2122 can refer to moving the second burr 232 and the fixing shaft 2128. Accordingly, the size of the ground coffee powder can be adjusted by adjusting the size of the grinding space, i.e., the depth of insertion between the first burr 231 and the second burr 232 or the depth of insertion of the fixing shaft 2128 into the fixing shaft coupling groove 2421a.

Adjusting the insertion depth between the first burr 231 and the second burr 232 can refer that the distance between the first burr blade 2316 and the second burr blade 2326 can be adjusted.

As described above, in some implementations, the grinder 200 included in the coffee extraction apparatus 1000 can be easily removed and cleaned.

Internal contamination can be minimized by simplifying the movement path of coffee powder produced by grinding of the grinder.

The impact and vibration generated in grinding whole beans by the grinder can be reduced.

The grinding degree of whole beans can be automatically adjusted according to the user's preference.

What is claimed is:

1. A coffee extraction apparatus comprising:
   a first grinder comprising:
     a first burr configured to rotate,
     a first burr through-hole defined in the first burr in an axial direction of the first burr,
     a first burr inlet disposed at a first end of the first burr through-hole to allow whole beans to be introduced thereinto,
     a first burr outlet disposed at a second end of the first burr through-hole opposite to the first end of the first burr through-hole to discharge coffee powder, and
     a first rotary part coupled to an outer surface of the first burr and configured to rotate the first burr;
   a second grinder comprising:
     a second burr inserted into the first burr through-hole through the first burr outlet to define a grinding space for grinding the whole beans with the first burr,
     a burr coupler that supports the second burr and that is configured to couple to the second burr and move the second burr in the axial direction of the first burr, and
     a second rotary part that is connected to the burr coupler and a second gear part, the second gear part being configured to be rotated by a second power part;
   a first driving unit disposed at an outside of the first grinder and configured to generate rotational force;
   a second driving unit configured to rotate the second rotary part;
   a grinder fixing part coupled to the first driving unit and defining a space configured to receive the first grinder, the first grinder being configured to receive the rotational force from the first driving unit;
   an extractor that defines an opening on a first side facing the first burr outlet to receive the coffee powder discharged through the first burr outlet and that is configured to mix the coffee powder with water to extract coffee liquid; and
   a water supplier configured to supply water to the extractor,
   wherein the first grinder is configured to be selectively separated from the grinder fixing part,
   wherein the second grinder is configured to be selectively separated from the first grinder,
   wherein the second rotary part comprises:
     a rotating ring rotatably connected to the second gear part, and
     a cylindrical guide that passes through the rotating ring and that is coupled to the burr coupler, and
   wherein the cylindrical guide is configured to, based on the rotating ring being rotated, move in the axial direction of the first burr to thereby (i) move the burr coupler in the axial direction of the first burr and (ii) adjust a depth of insertion of the second burr into the first burr.

2. The coffee extraction apparatus of claim 1, wherein the first grinder further comprises:
   a first housing that accommodates the first rotary part and that supports the first rotary part,
   wherein the first housing comprises:
     a housing body defining a space to accommodate the first rotary part,
     a first opening that is defined in the housing body and that is opened toward the extractor, and
     a second opening that is defined in the housing body opposite to the first opening,
   wherein, based on the whole beans passing through the first burr inlet to the first burr outlet, the whole beans are grounded into the coffee powder and the coffee powder is discharged through the first opening.

3. The coffee extraction apparatus of claim 2, further comprising:
   a fixing shaft that is inserted through the second burr and that is coupled to the second burr in the axial direction of the first burr.

4. The coffee extraction apparatus of claim 3, further comprising:
   a second housing that defines a whole bean introduction hole allowing the whole beans to be introduced therethrough and that is coupled to the first housing in the axial direction of the first burr to allow the first rotary part to rotate.

5. The coffee extraction apparatus of claim 4, wherein the second housing comprises:
   a fixing shaft support supporting the fixing shaft inserted into the whole bean introduction hole,
   wherein the fixing shaft support is connected to an inner surface of the whole bean introduction hole by at least one reinforcing rib.

6. The coffee extraction apparatus of claim 1, wherein the first driving unit comprises:
   a first power part configured to generate rotational power; and
   a first gear part connected to the first power part to rotate the first rotary part.

7. The coffee extraction apparatus of claim 6, wherein the first grinder further comprises:
   a first housing that accommodates the first rotary part and that supports the first rotary part,
   wherein the first housing comprises:
     a housing body defining a space to accommodate the first rotary part,
     a first opening that is defined in the housing body and that is opened toward the extractor,
     a second opening that is defined in the housing body opposite to the first opening, and
     a first communication hole defined through the housing body in a radial direction of the first rotary part,
   wherein the first rotary part has a gear shape on an outer circumferential surface of the first rotary part, and
   wherein the first rotary part and the first gear part are connected to each other through the first communication hole to rotate.

8. The coffee extraction apparatus of claim 7, wherein the first grinder further comprises:
   a second housing that is rotatably coupled to the first rotary part in the axial direction of the first burr, that is coupled to the first housing, and that defines a whole bean introduction hole allowing the whole beans to be introduced from a side of the first burr inlet,
wherein the whole beans introduced through the whole bean introduction hole are grounded into the coffee powder while moving from the first burr inlet to the first burr outlet, and the coffee powder is discharged to the extractor through the first opening.

9. The coffee extraction apparatus of claim 7, wherein the second rotary part is accommodated in the housing body so as to be positioned closer to the first opening than the first rotary part.

10. The coffee extraction apparatus of claim 9, wherein the first rotary part and the second rotary part are driven independently.

11. The coffee extraction apparatus of claim 10, wherein the second driving unit includes:
the second gear part connected to the second rotary part to rotate the second rotary part; and
the second power part configured to transmit rotational power to the second gear part.

12. The coffee extraction apparatus of claim 11, wherein the housing body further comprises a second communication hole defined through the housing body in a radial direction of the second rotary part,
wherein the second rotary part and the second gear part are connected to each other through the second communication hole.

13. The coffee extraction apparatus of claim 12, wherein a center position of the first communication hole is different from a center position of the second communication hole.

14. The coffee extraction apparatus of claim 13, wherein the radial direction of the first rotary part having the first communication hole is different from the radial direction of the second rotary part having the second communication hole.

15. The coffee extraction apparatus of claim 1, further comprising:
a first power part configured to generate rotational power;
a planetary gear part configured to reduce a rotational speed of the first power part at a predetermined ratio; and
a first gear part connected to the planetary gear part to rotate the first rotary part.

16. The coffee extraction apparatus of claim 15, further comprising:
a gear cover coupled to a side surface of the grinder fixing part to protect the planetary gear part; and
a gear fixing part coupled to an upper portion of the gear cover to support the first gear part,
wherein the grinder fixing part, the gear cover, and the gear fixing part are integrated with each other.

17. The coffee extraction apparatus of claim 1, wherein the burr coupler comprises:
a burr coupler through-hole defined through the burr coupler in the axial direction of the first burr,
wherein a diameter of the burr coupler through-hole is longer than a diameter of the second burr,
wherein a portion of the second burr positioned on a side facing away from the first burr is accommodated in the burr coupler through-hole such that the coffee powder discharged through the first burr outlet is discharged through the burr coupler through-hole.

18. The coffee extraction apparatus of claim 17, further comprising:
a ring-shaped handle coupled to the burr coupler to insert or separate the second burr.

19. The coffee extraction apparatus of claim 1, further comprising a supporter that is disposed outside the first grinder and the extractor and that supports the first grinder and the extractor.

* * * * *